(12) United States Patent  
Forman

(10) Patent No.: US 6,350,057 B1  
(45) Date of Patent: Feb. 26, 2002

(54) REINFORCED RECLOSABLE PACKAGE SEALS

(75) Inventor: Harold M Forman, Pennsburg, PA (US)

(73) Assignee: Sealstrip Corp., Boyertown, PA (US)

( * ) Notice: Subject to any disclaimer, the term of this patent is extended or adjusted under 35 U.S.C. 154(b) by 0 days.

(21) Appl. No.: 09/364,180

(22) Filed: Jul. 29, 1999

Related U.S. Application Data

(63) Continuation-in-part of application No. 08/861,576, filed on May 22, 1997, now Pat. No. 5,944,425.

(51) Int. Cl.[7] .............................................. B65D 33/16
(52) U.S. Cl. ........................... 383/61; 383/63; 383/204; 24/587
(58) Field of Search ...................... 383/61, 63; 24/587, 24/30.5 R

(56) References Cited

U.S. PATENT DOCUMENTS

| | | | | |
|---|---|---|---|---|
| 4,235,653 A | * | 11/1980 | Ausnit | |
| 4,589,145 A | * | 5/1986 | Van Erden et al. | 383/63 X |
| 4,617,683 A | * | 10/1986 | Christoff | 383/63 |
| 4,782,951 A | * | 11/1988 | Griesbach et al. | |
| 4,823,961 A | * | 4/1989 | Griesbach et al. | |
| 4,848,928 A | * | 7/1989 | Ausnit | 383/63 X |
| 4,923,309 A | * | 5/1990 | VanErden | 383/61 X |
| 4,941,307 A | * | 7/1990 | Wojcik | 383/63 X |
| 4,986,673 A | * | 1/1991 | Bell | 383/61 |
| 5,005,707 A | * | 4/1991 | Hustad et al. | 383/61 X |
| 5,014,856 A | * | 5/1991 | Griesbach et al. | 383/61 X |
| 5,037,138 A | * | 8/1991 | McClintock et al. | 383/61 X |
| 5,050,736 A | * | 9/1991 | Griesbach et al. | 383/61 X |
| 5,058,761 A | * | 10/1991 | Williams | 383/63 X |
| 5,447,772 A | * | 9/1995 | Flieger | 383/63 X |
| 5,461,845 A | * | 10/1995 | Yeager | 383/63 X |
| 5,944,425 A | * | 8/1999 | Forman | 383/61 |

* cited by examiner

Primary Examiner—Allan N. Shoap  
Assistant Examiner—Robin A. Hylton  
(74) Attorney, Agent, or Firm—Walter B. Udell

(57) ABSTRACT

Packages having web formed resealable interlocking closures of packaging film fanfolded to form a stack and heat sealed together forming a multilayered strip in plane with the film. The strip is abraded on one surface, the film passing into the package former where packages are formed having longitudinal package seals, and which places portions of the strip in apposed position. The package ends are sealed and the resealable locking closure is formed in the strip. The female portion of the locking closure is formed in the package face that includes the overlapped longitudinal package seal. Alternatively, the strip is not abraded and the inner and outer parts of the resealable closure are separately formed before package formation takes place. To form the strip, heat sealing a strip of heat sealable material to the packaging film may also be utilized. Optionally formed in the resealable closure are hinges and reinforcing V-notches.

40 Claims, 19 Drawing Sheets

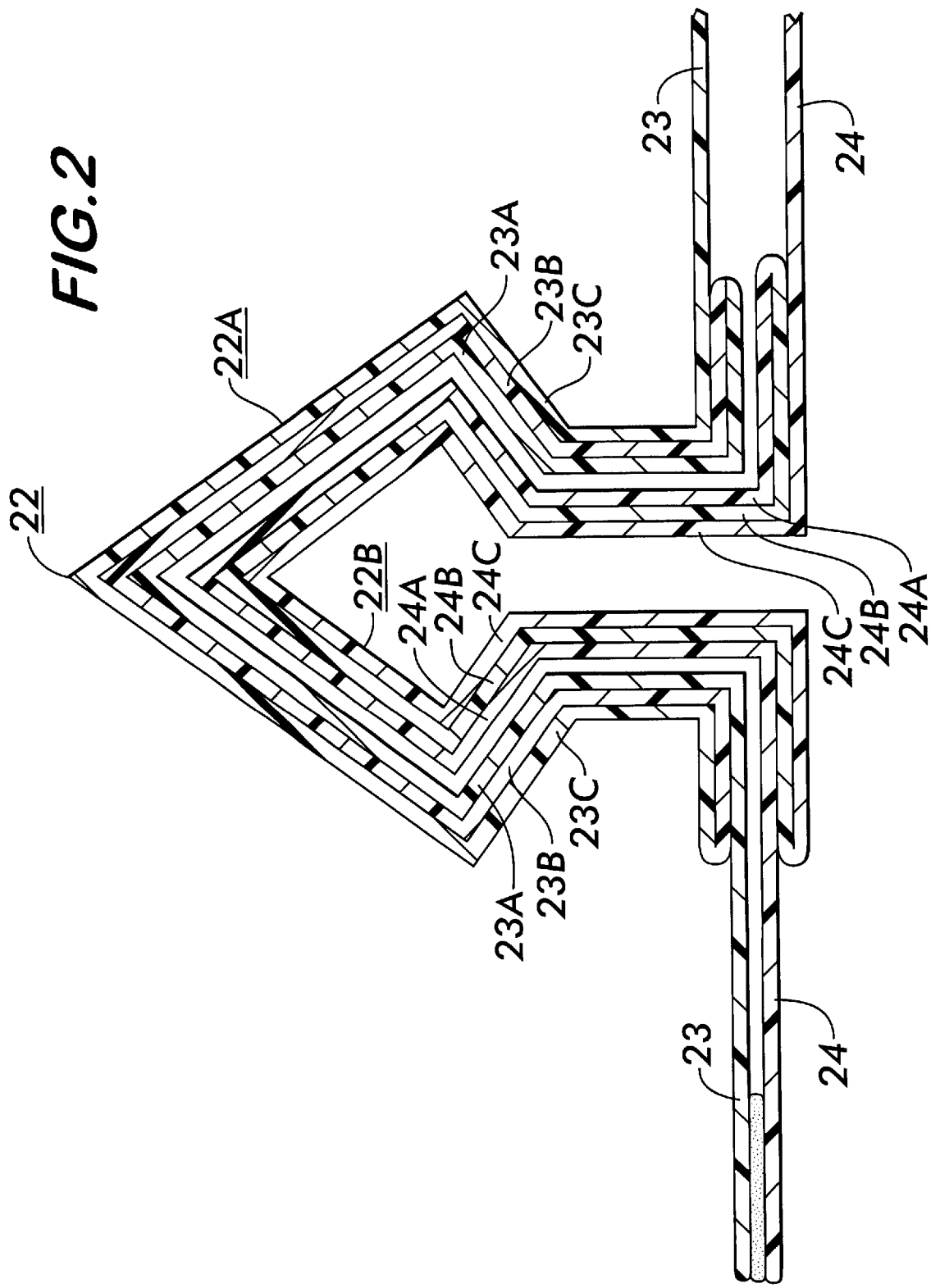

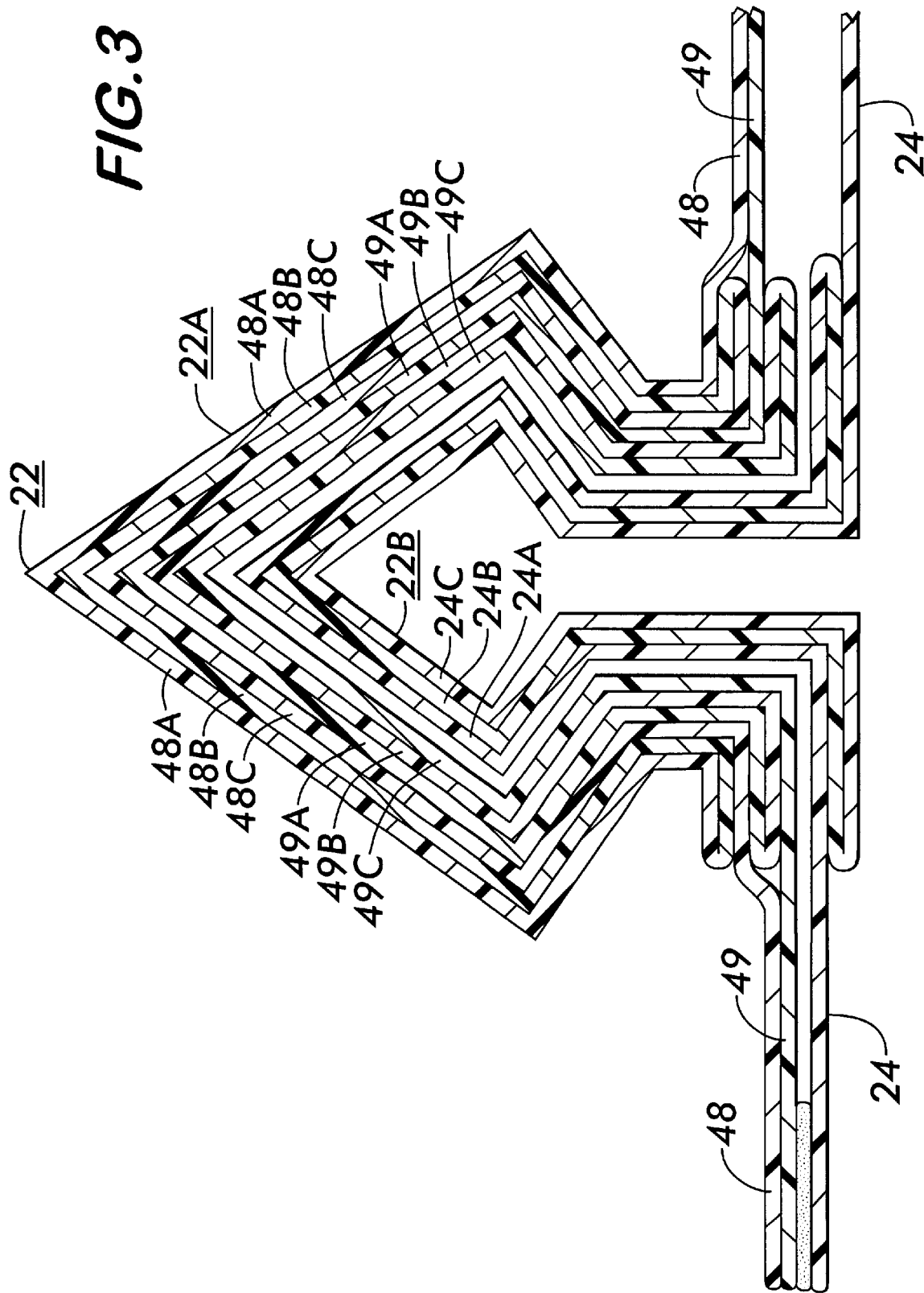

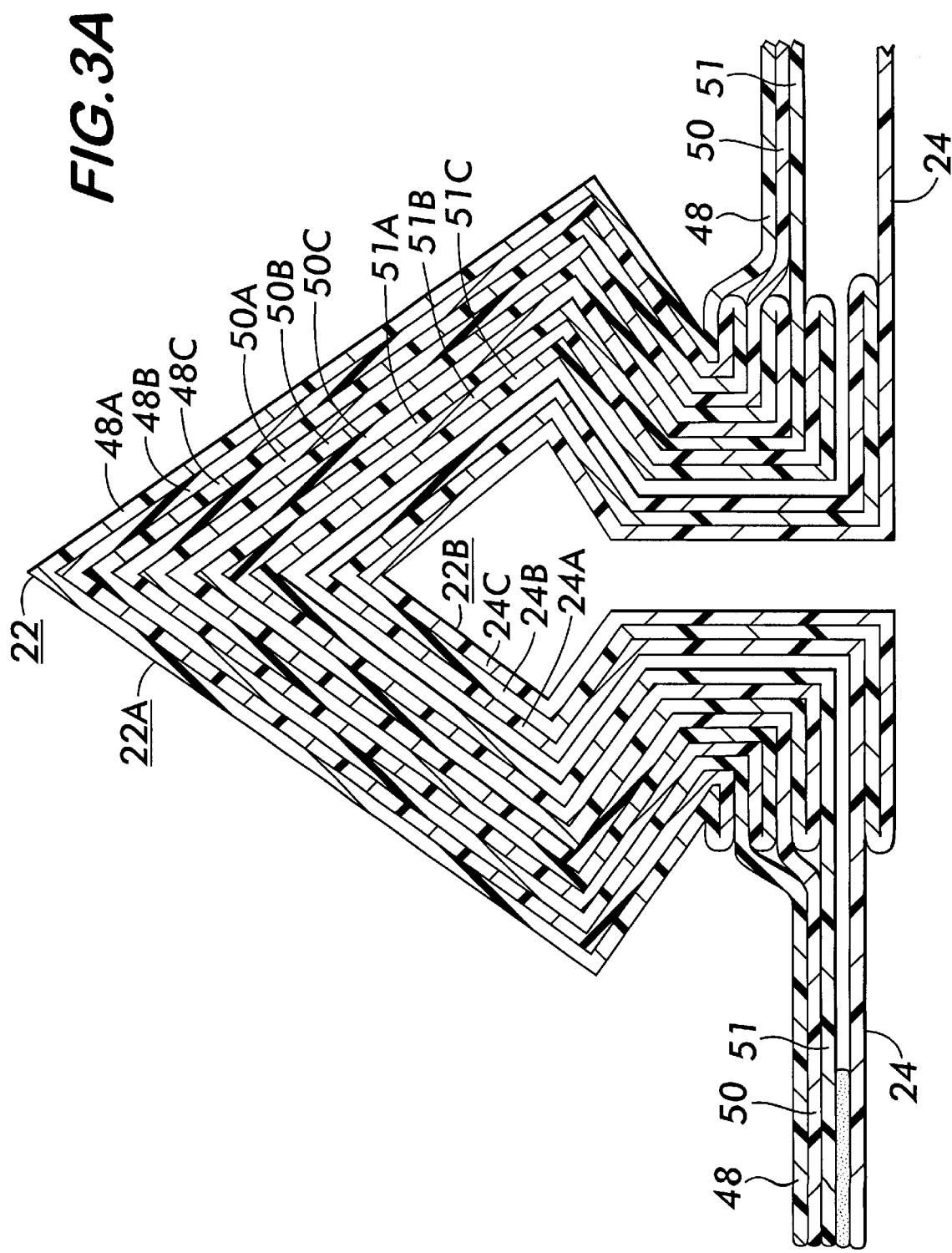

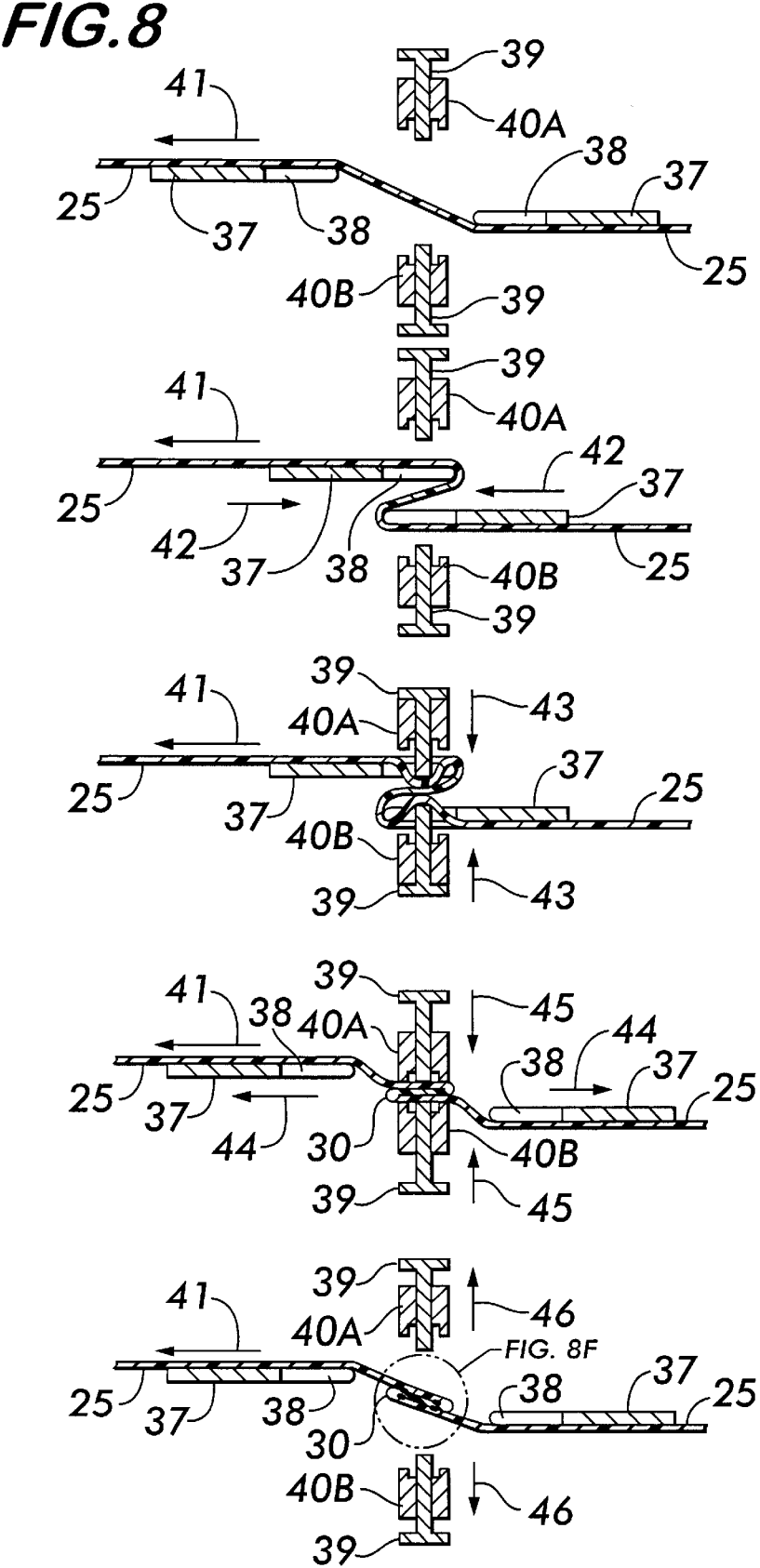

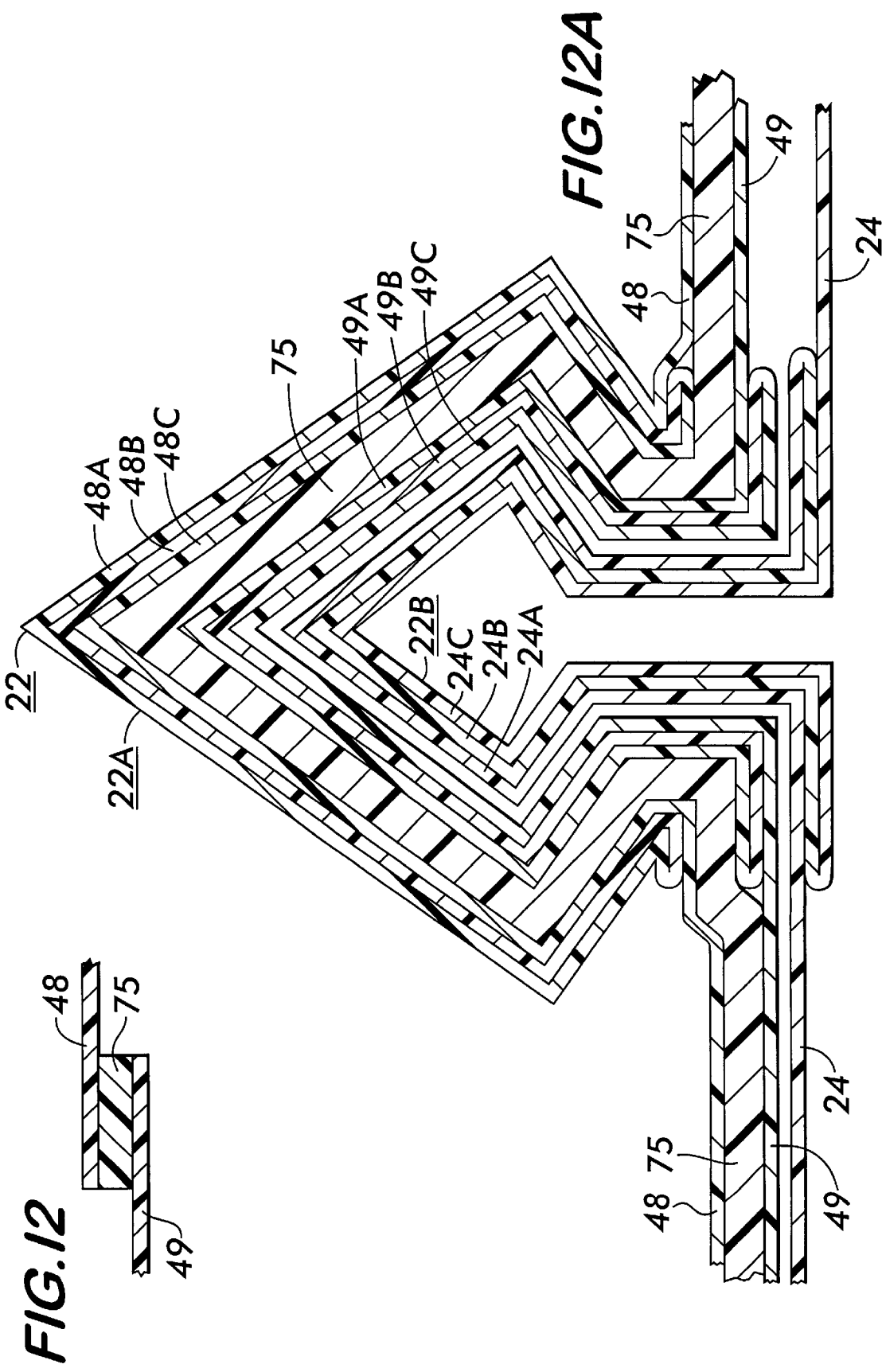

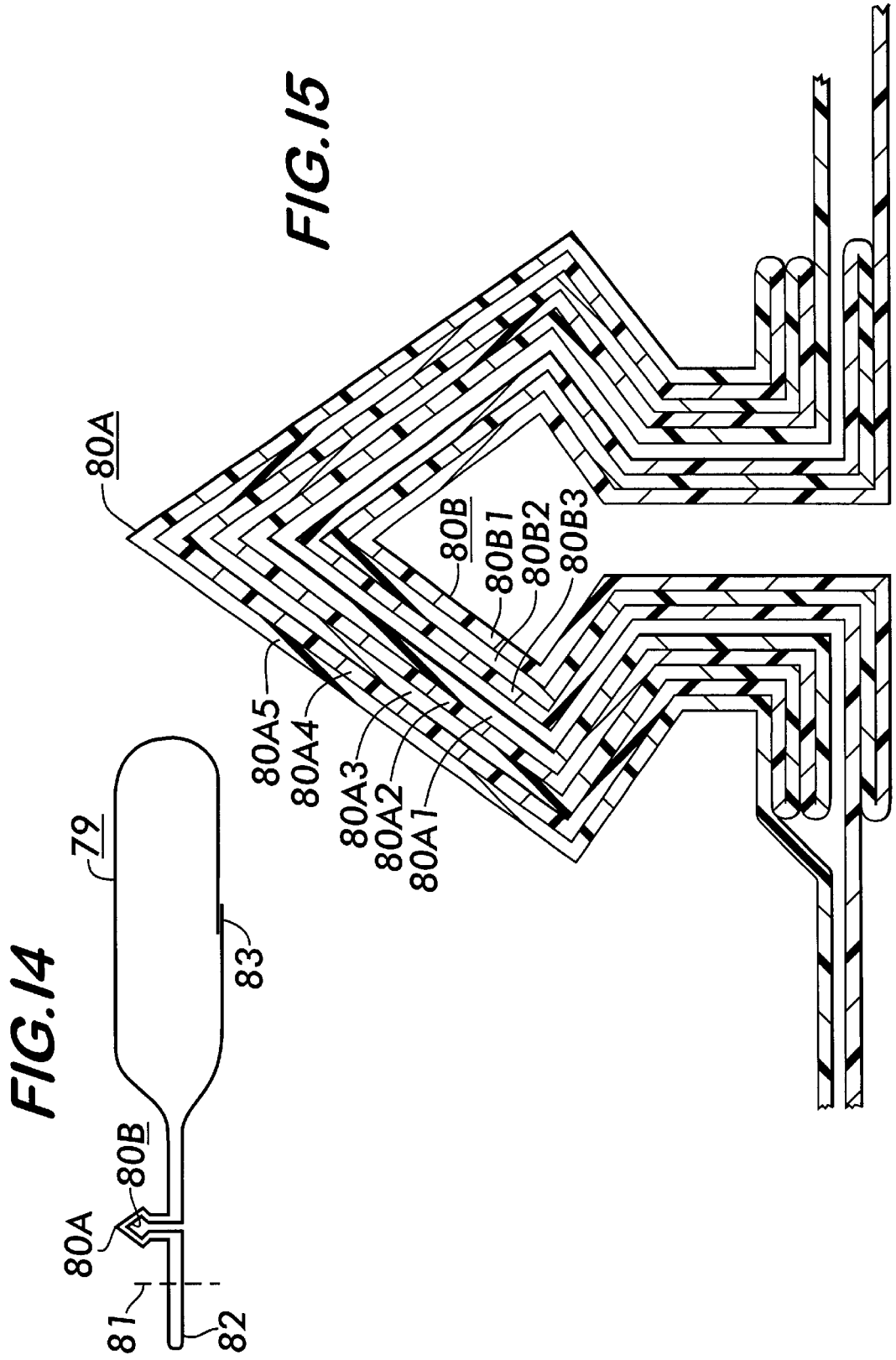

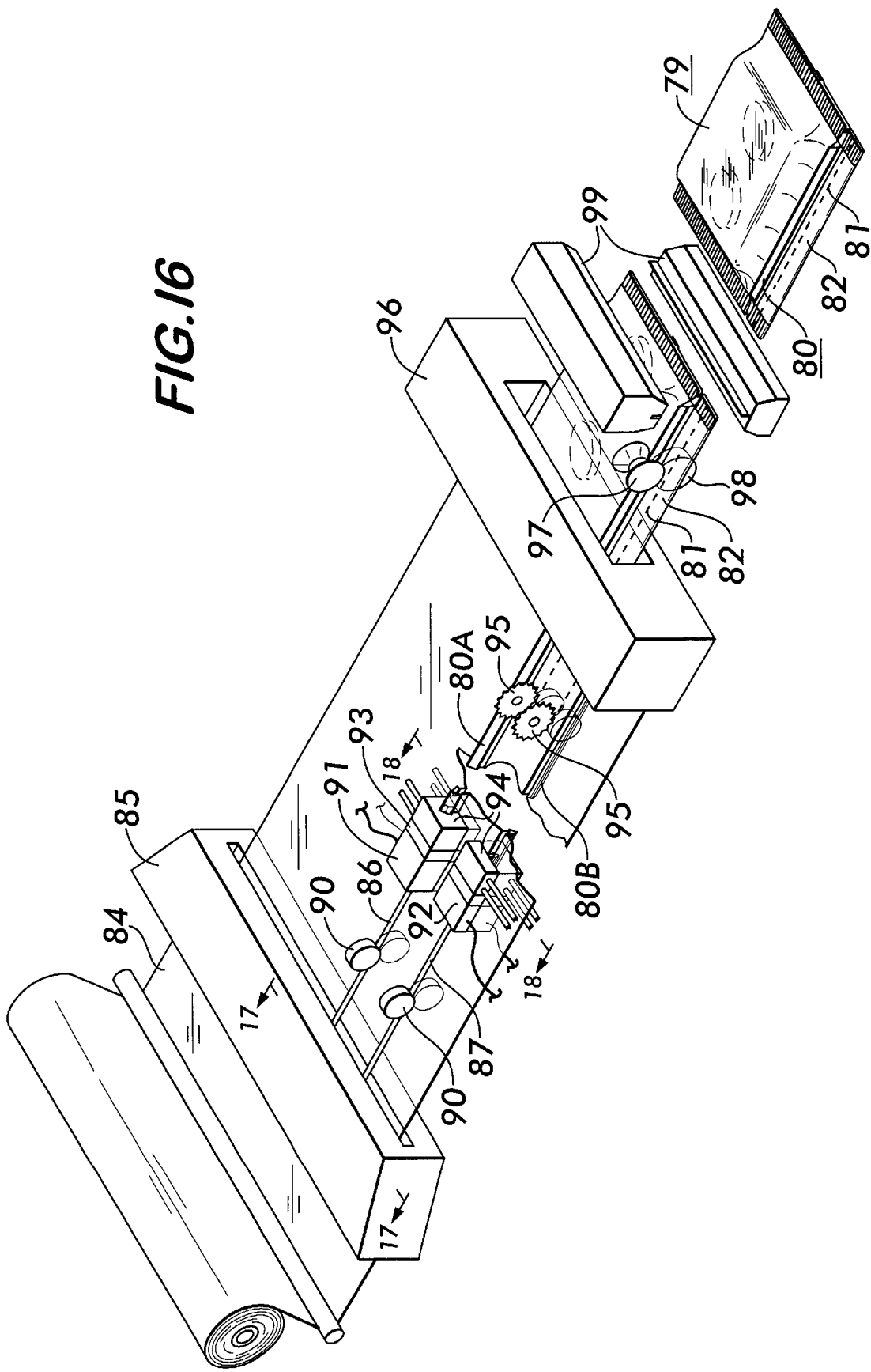

REINFORCED RECLOSABLE PACKAGE SEALS

This application is a continuation in part of application Ser. No. 08/861,576 filed on May 22, 1997, now U.S. Pat. No. 5,944,425.

This invention relates generally to packaging systems, and more particularly to flexible packages of the kind shown in my copending earlier application further having a primary reinforced openable and resealable interlocking closure which may be further provided with hinge formations and V-notch reinforcements spaced along the length of the closure, the resealable interlocking closure having male and female parts with the primary reinforcement being formed in the female part. Several ways for forming the primary reinforcement are disclosed. Also disclosed are methods and apparatus for making such packages and closures from a continuous web of flexible film, the closures being formed during package formation at line speed.

BACKGROUND OF THE INVENTION

As described in my earlier application, in the past, the methods of making reclosable flexible packages have involved either the extrusion of the locking structure along with the film extending longitudinally in the direction of film extrusion along the opposite edges of the film, or by heat sealing a separately made resealable closure structure to the package film. The first type of package formation results in packages having the reclosable feature in the consumer non-preferred position along the long edge of the package, while the second type of package formation results in packages which are expensive to make because of the need to inventory and store rolls of the separate resealable closure structure for attachment to the packaging film and the need to insure that the separately obtained packaging film and closure structure are made of compatible materials. Shown and described in my earlier application is a resealable interlocking closure of the same general kind as shown and described in this application, but which does not include the improved features of the present invention, namely, the primary reinforcement in the female part and the hinge formations and V-notch reinforcements, each of which contributes to making a superior closure.

SUMMARY OF THE INVENTION

As in the earlier application, the package and system according to the present invention also utilizes a novel converter device mounted atop or adjacent to standard packaging apparatus to form a small amount of the running packaging film into the resealable closure structure as an integral part of the film oriented in one form in the consumer desired direction extending transversely to the long dimension of the package. The converter functions with both horizontal and vertical form/fill/seal wrapping machines and with overwrap packagers, and uses diverse double sided heat seal packaging films such as polypropylene, polyester, polyvinyl chloride, high and medium density polyethylene, thermoplastic heat seal coated non-plastic films, and various film laminations.

In the previously referred to one form of the invention the package formation begins by feeding the plastic film, as it unwinds from the storage roll, into the the converter, where the film is automatically layered by fanfolding across the entire width of the film to form a stack. Layering other than by fanfolding to form a stack may be utilized, as for example heat sealing a strip of heat sealable material to the packaging film, but fanfolding is a convenient, fast and economical method of stack forming. The number of folds will vary depending on the thermoforming properties and thickness of the particular film being used. The stacked layers are immediately edge heat sealed together widthwise of the running film forming a multilayered strip of typically one half inch width extending completely across the film width in plane with the film, the strip layers being unsecured to one another between the edge seals. Next, the multilayered strip carried by the packaging film is abraded on one surface to remove the thermoplastic heat seal coating, in one case except at one end, and in another case except at both opposite ends, and leave the remainder of that surface of the strip uncoated, the film being then passed into the package forming apparatus where the product wrapping and longitudinal package sealing takes place. After emerging from the package forming apparatus the package ends are sealed and the package resealable locking feature is formed in the stacked layers of film or in the strip which has been heat sealed to the film, with or without the hinges and the V-notch reinforcements as desired. The entire process takes place at packaging line speed.

In another form of the invention the package formation begins by feeding the plastic film, as it unwinds from the storage roll, into the the converter, where the film is first longitudinally folded along one edge before being fanfolded as previously described. A modification of this form of the invention is provided by adding a strip of film to at least one longitudinal marginal edge of the web in lieu of edge folding, the strip being of substantially the same width as the package longitudinal seal. The point of application of the strip determines the form of the primary reinforcement of the interlocking closure.

In the foregoing described forms of the invention the reinforced resealable interlocking closures are all formed transversely to the direction of film flow. In one other form of the invention the reinforced resealable interlocking closures are formed in line with the direction of film flow along one edge of the package and may be formed in either of the two previously described ways, by fanfolding or by adding a strip of heat sealable material to the packaging film. In this form of the invention the primary reinforcement extends the full length of the female part of the resealable closure.

My earlier patent application discloses an interlocking closure similar to that of the present invention, except that in that package structure the male and female parts are reversed as compared to the present invention, and as previously noted the hinge structures and V-notch reinforcements are absent. In the present invention, the female part of all embodiments of the invention except one is formed on the face of the package where the longitudinally extending package seal is formed. This is a very significant difference, in that by so forming the female portion to include the longitudinally extending overlapped central region of the package, it includes in its structure several times the number of plies in the male part that interlocks with it, the number of additional plies being determined by the particular form of the invention utilized. In the form of the invention where the interlocking closure is along one edge of the package, the female part of the closure can also be formed with more plies than the male part to provide a reinforced interlock. These reinforcements provide a much stronger-package lock which better prevents the packages from inadvertent opening. When incorporated, the V-notches provide further resistance to opening of the interlock, and the hinges provide the ability to control the shape of the package opening. Accordingly, it is a primary object of the invention to provide novel reinforced openable and resealable interlocking closures for packages.

Another object of the invention is to provide packages having novel reinforced openable and resealable interlocking closures which may be provided at intervals along their lengths with hinge structures which separate the interlocking closures into segments and control the shape of the package opening.

A further object of the invention is to provide a package having a novel reinforced openable and resealable interlocking closure which may be provided at intervals along its length with V-notch reinforcements.

An additional object of the invention is to provide a package having a novel reinforced openable and resealable interlocking closure as aforesaid in which the reinforcement is partly provided by selectably added layers of the packaging or other film.

Yet another object of the invention is to provide packages having novel reinforced openable and resealable interlocking closures as aforesaid in some of which the closure is formed transversely to the direction of packaging film flow and in others of which the closure is formed in line with the direction of packaging firm flow during the packaging operation running at line speed.

A yet further object of the invention is to provide novel packages as aforesaid in which the reinforced resealable interlocking closure is integrally formed from layered together contiguous portions of the packaging mm during the packaging process and does not require that additional materials be added to the packaging film to form the resealable closure, and in another form the resealable interlocking closure is formed in a heat sealable strip heat sealed to the packaging film.

A still further object of the invention is to provide novel packages as aforesaid in which the packages may be formed from a variety of packaging films such as polypropylene, polyester, polyvinyl chloride, high and medium density polyethylene, and various film laminations.

Still another object of the invention is to provide novel packages as aforesaid in which the reinforced resealable interlocking closure is integrally formed from the packaging film by reversely fanfolding the packaging film either across or orthogonal to its width to form a stack, sealing together the reversely folded stack in plane with the film, and thermoforming the sealed stack into the resealable locking feature.

A further object of the invention is to provide a package having a novel reinforced openable and resealable interlocking closure in which the resealable closure extends only partly across the package to limit the open size of the closure.

An additional object of the invention is to provide novel methods and apparatus for making packages according to the invention.

The foregoing and other objects of the invention will be more clearly understood from a reading of the following description in conjunction with an examination of the appended drawings, wherein:

FIG. 2 is an enlarged cross sectional view through the resealable closure and end seal as would be seen when viewed off the package center along the line 2—2 on FIG. 1, showing both the male and female portions as formed of three plies of the packaging film and corresponding to the longitudinal seal package type of FIG. 1A;

FIG. 3 is an enlarged cross sectional view through the resealable closure and package end seal as would be seen when viewed centrally of the package along the line 3—3 on FIG. 1, showing the male portion formed of three plies of the packaging film and the reinforced female portion formed of six plies of the packaging film, also as corresponding to the longitudinal seal package type of FIG. 1A;

FIG. 3A is an enlarged cross sectional view through the resealable closure and package end seal as would be seen when viewed centrally of the package along the line 3—3 on FIG. 1 if the package longitudinal seal were as shown in FIG. 1B, showing the male portion as formed of three plies of the packaging film and the reinforced female portion as formed of nine plies of the packaging film;

Figure 1:
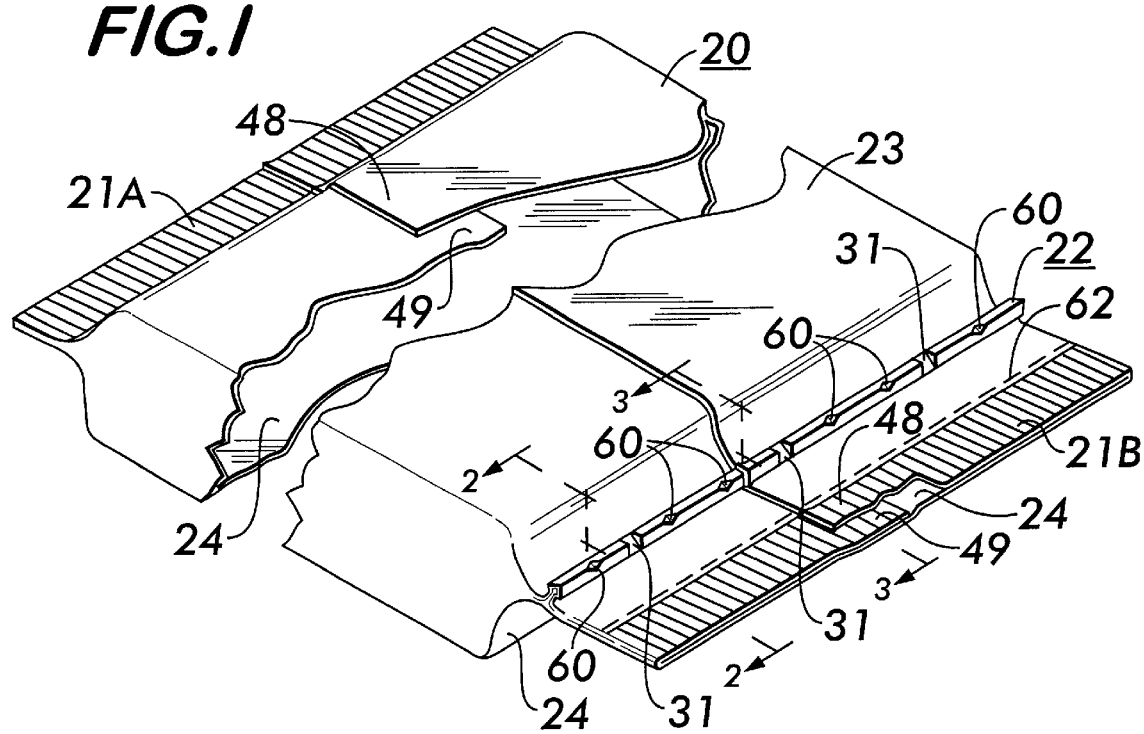
FIG. 1 is an isometric view of a package according to the invention showing showing the longitudinally extending package seal uppermost, the package end seals, the integrally formed reclosable locking feature with the reinforced female portion uppermost, and the hinges and V-notch reinforcements.
Figure 4:
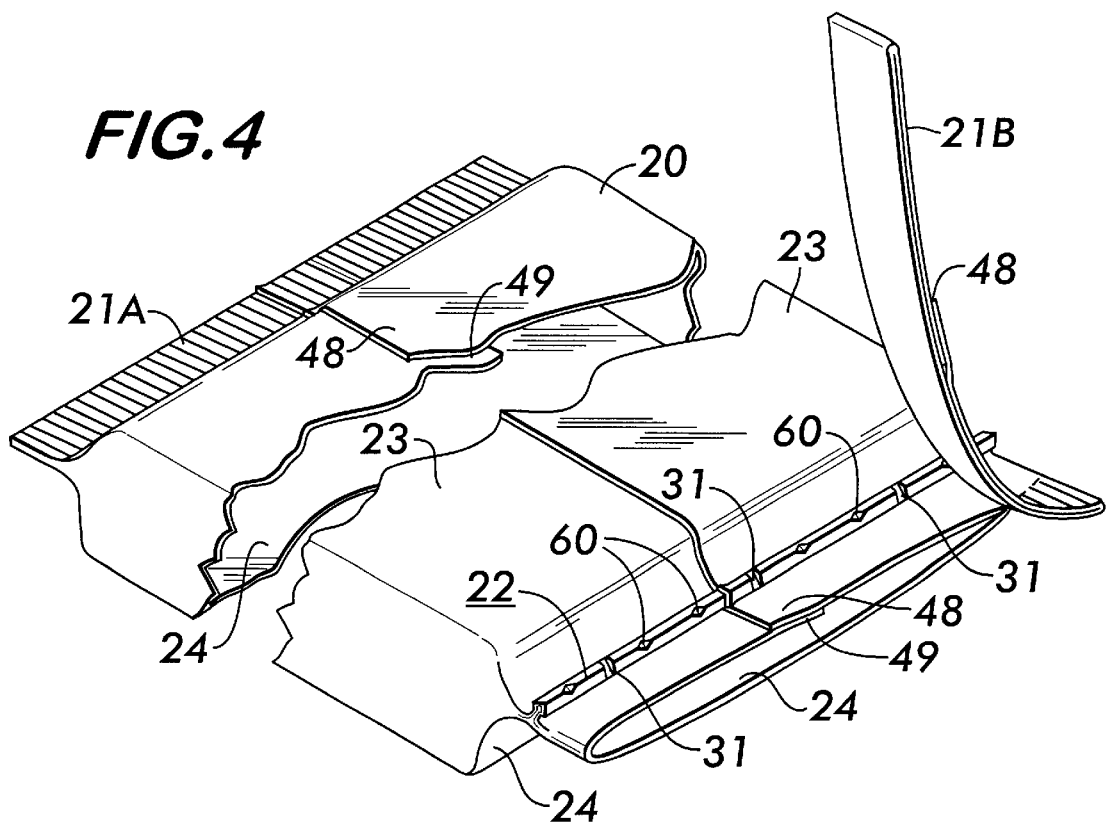
Figure 5:
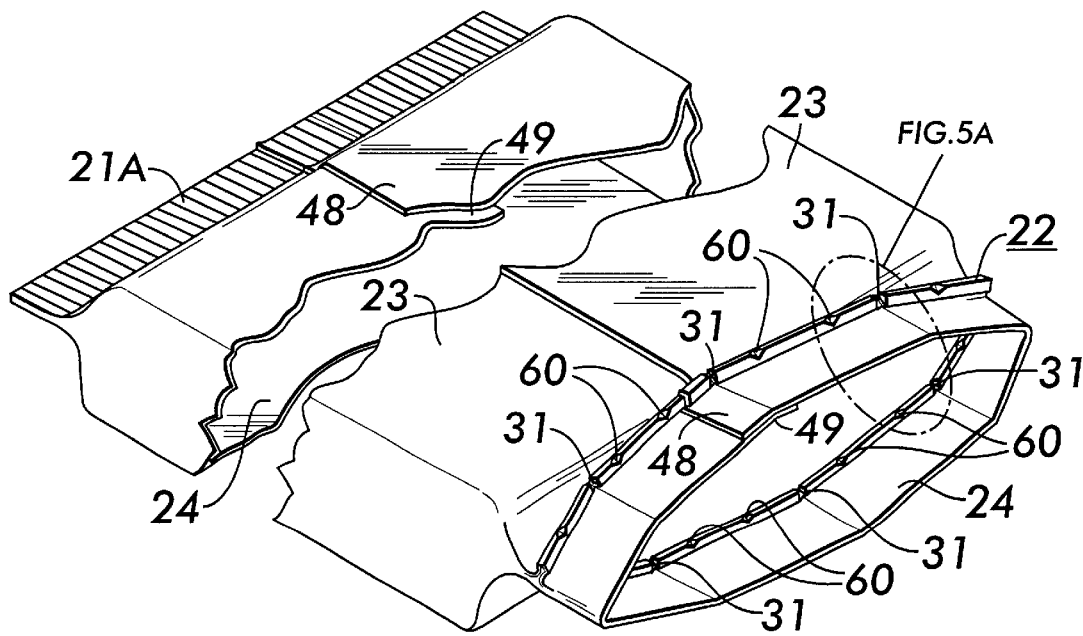
Figure 6:
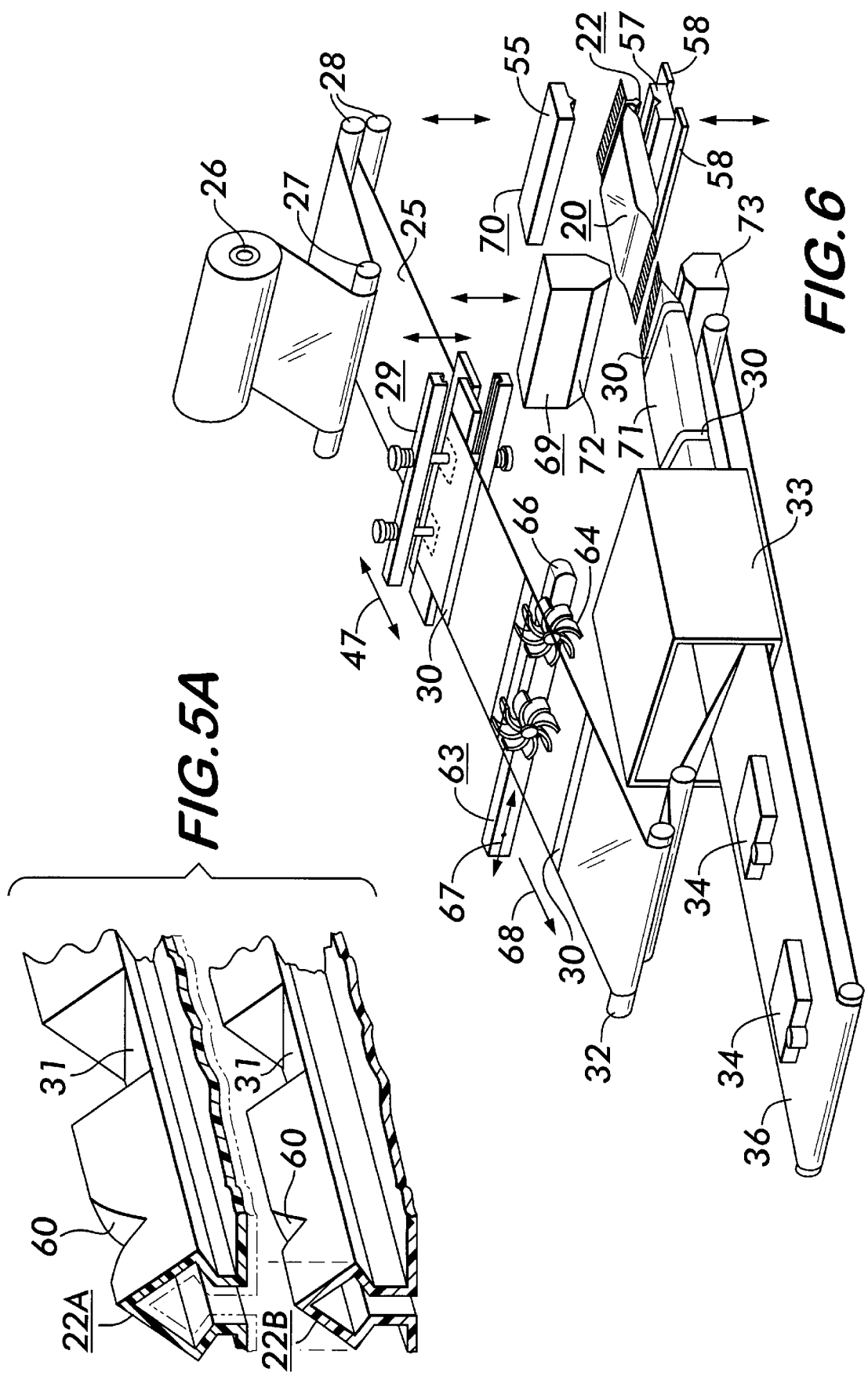
Figure 7:
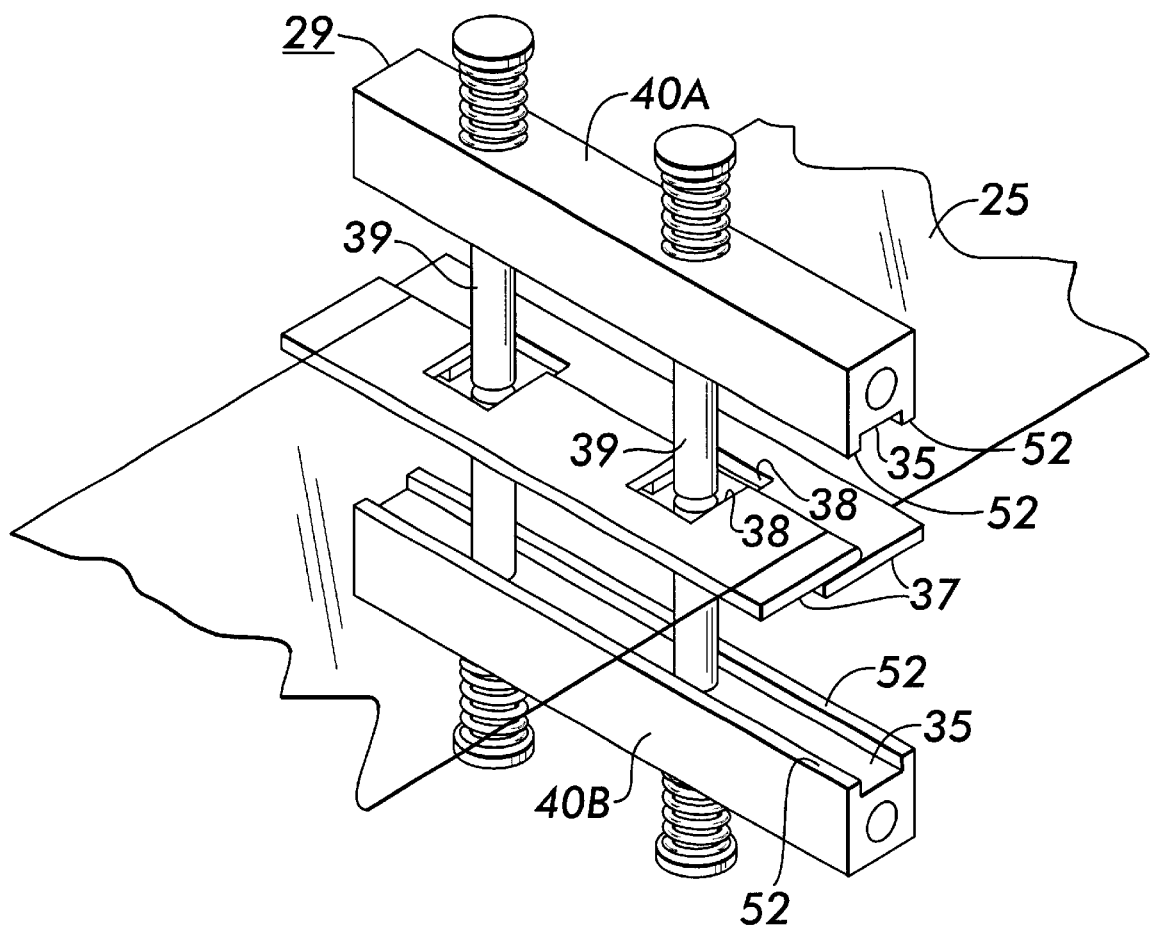
Figure 8F:
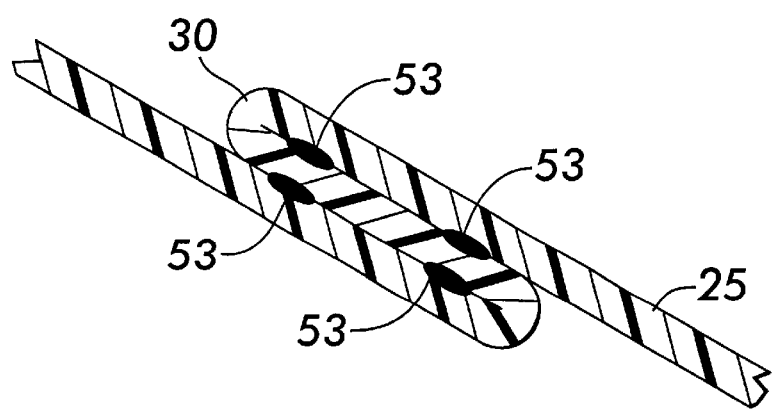
Figure 9:
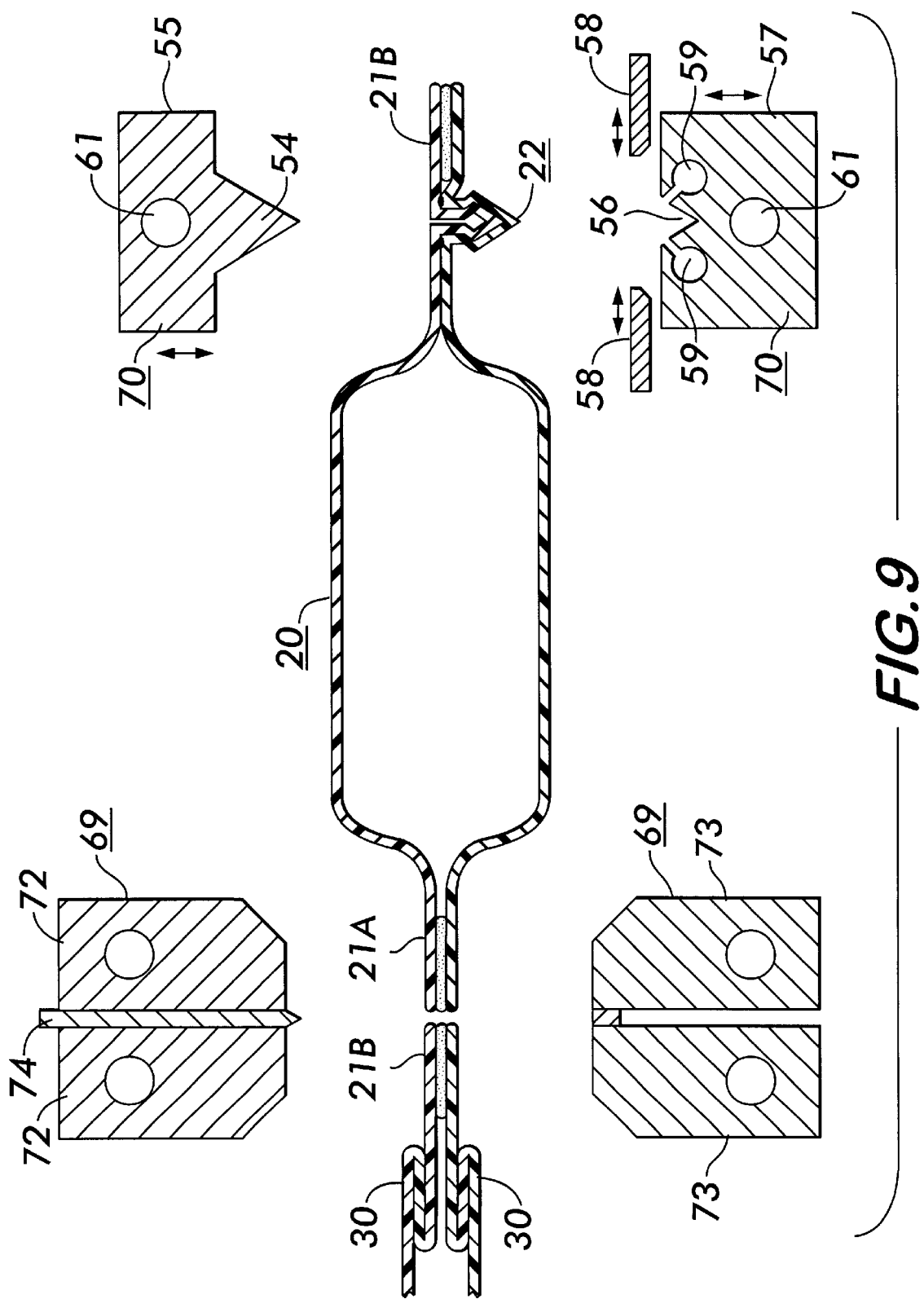
Figure 10:
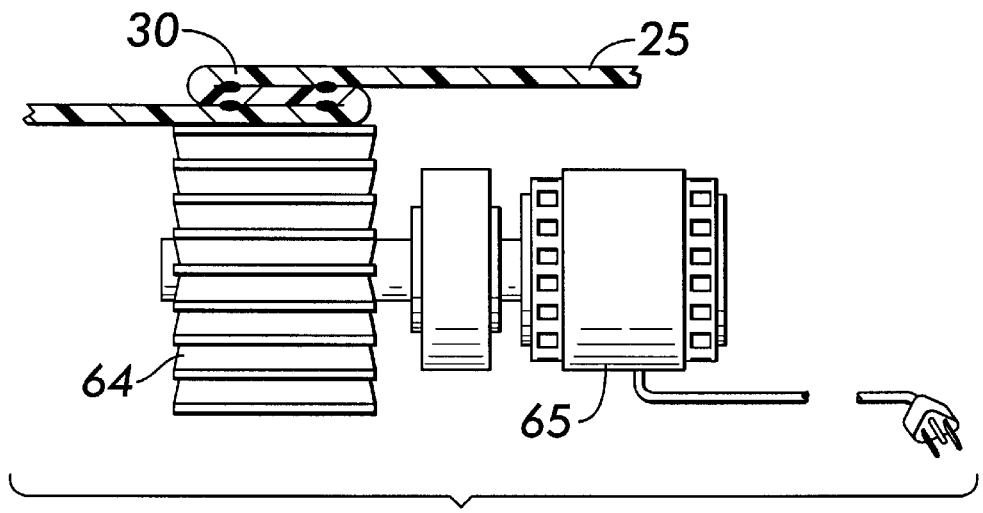
Figure 11:
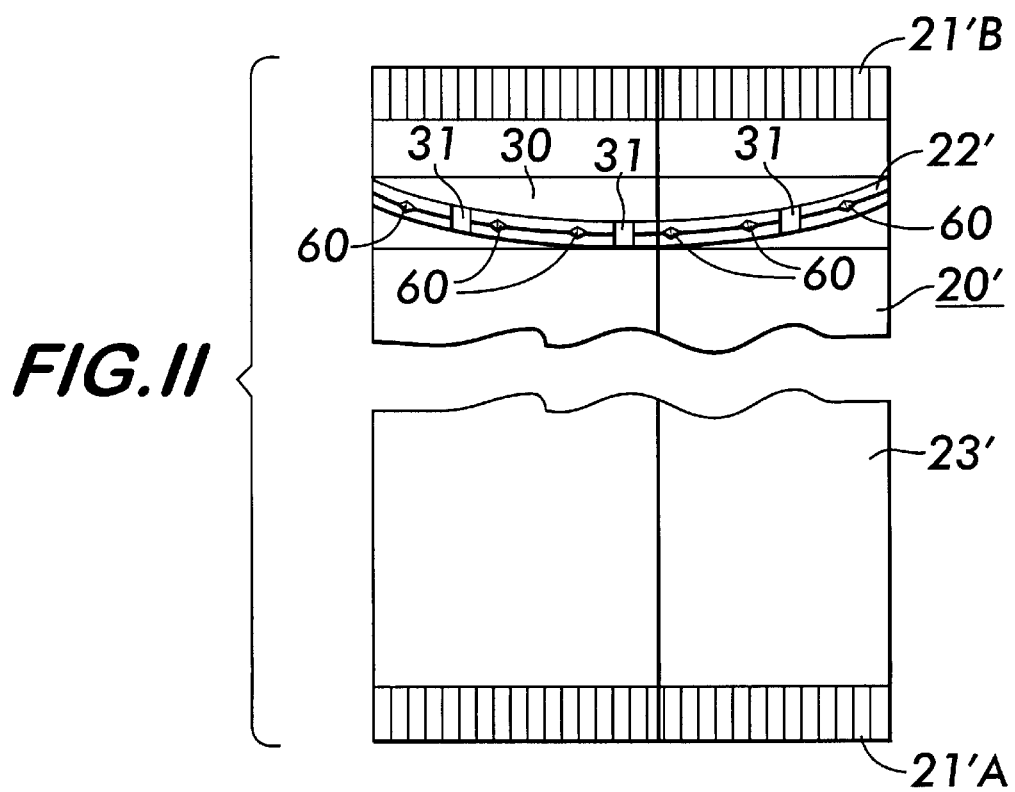

FIGS. 4 and 5 respectively show the tearing off of the package endseal and the opening of the resealable closure of a package as shown in FIG. 1 with the package opening shape being octagonalized by the action of the hinge formations;

FIG. 5A is an enlarged fragmentary view through the portion of the reclosable seal in the phantom circle on FIG. 5 showing the hinge formations and V-notch reinforcements;

FIG. 6 is a diagrammatic illustration of apparatus for and method of formation of packages according to the invention, showing the stages of package and closure forming from the packaging film during the packaging process;

FIG. 7 is an isometric view of the portion of the apparatus which accomplishes the fanfolding of the film;

FIGS. 8A through 8E are cross sectional views through the apparatus of FIG. 7 showing the stages of formation of a fanfolded and sealed film stack;

FIG. 8F is an enlarged fragmentary view through the portion of the sealed stack shown in the phantom circle on FIG. 8E;

FIG. 9 is a cross sectional view through the package end sealing and closure forming device for the reinforced resealable locking closure feature, the hinge formations and V-notches being formed at the same time when desired;

FIG. 10 is an end view of the film scouring wheels seen in FIG. 6 before the wrapping station;

FIG. 11 is a plan view of an alternative form of package according to the invention showing the package end seals and an arcuate integrally formed resealable locking feature according to the invention.

Figure 1A:
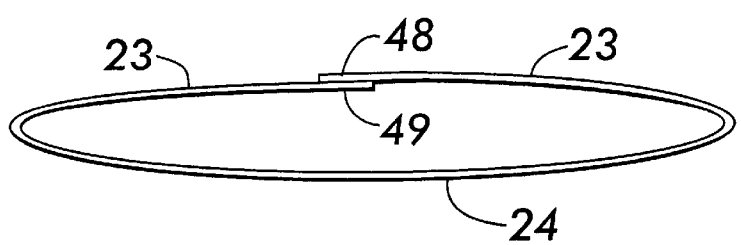
FIG. 1A is a digrammatic end view of an open package tube before end sealing showing the longitudinally extending package seal as a conventional single overlap type as seen in FIG. 1.
Figure 12B:
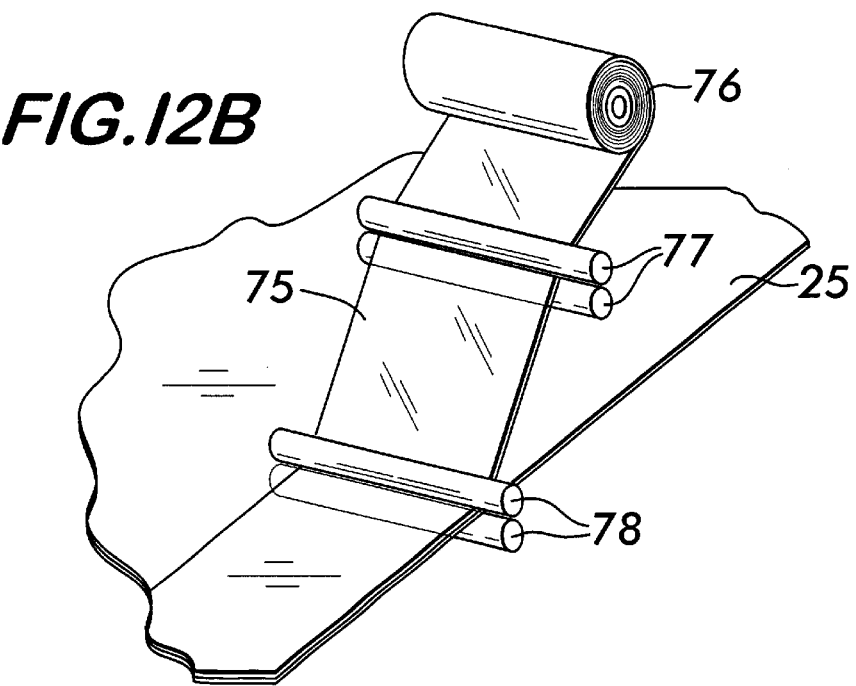
Figure 13:
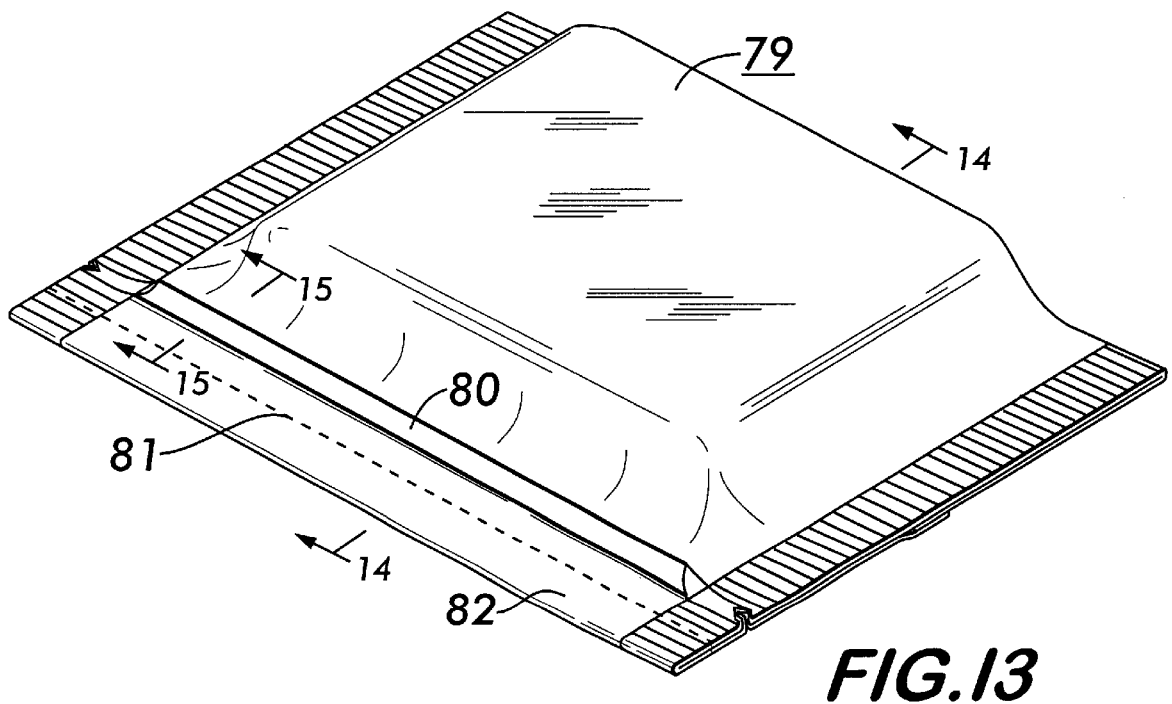
Figure 17:
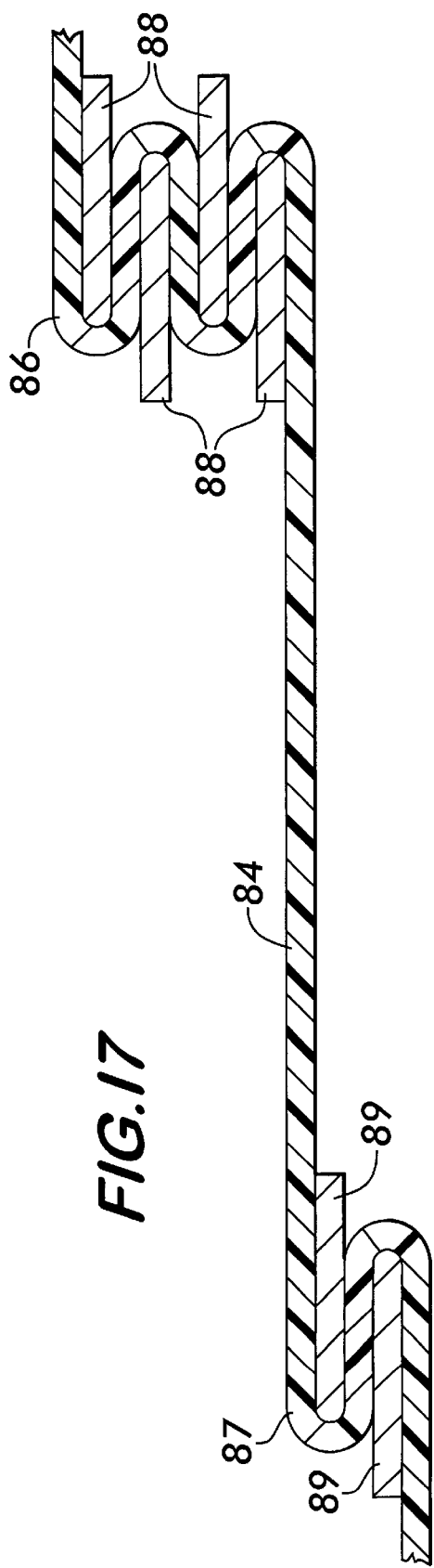
Figure 18:
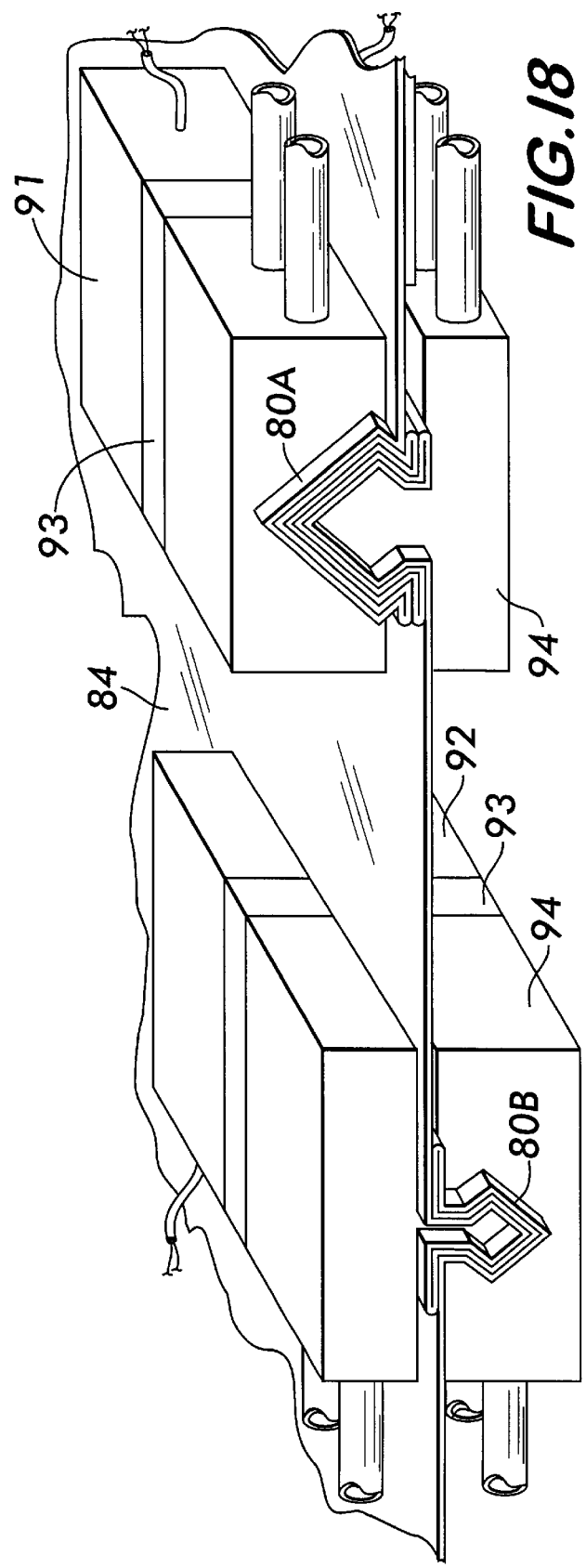
Figure 19:
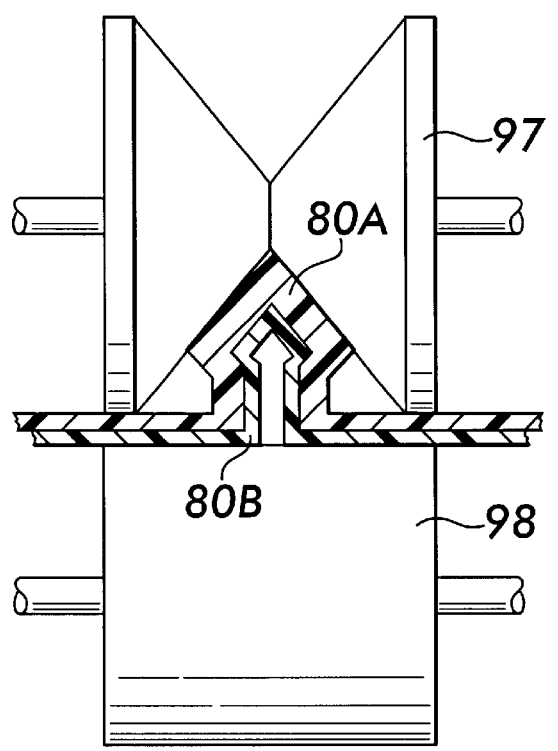
Figure 21:
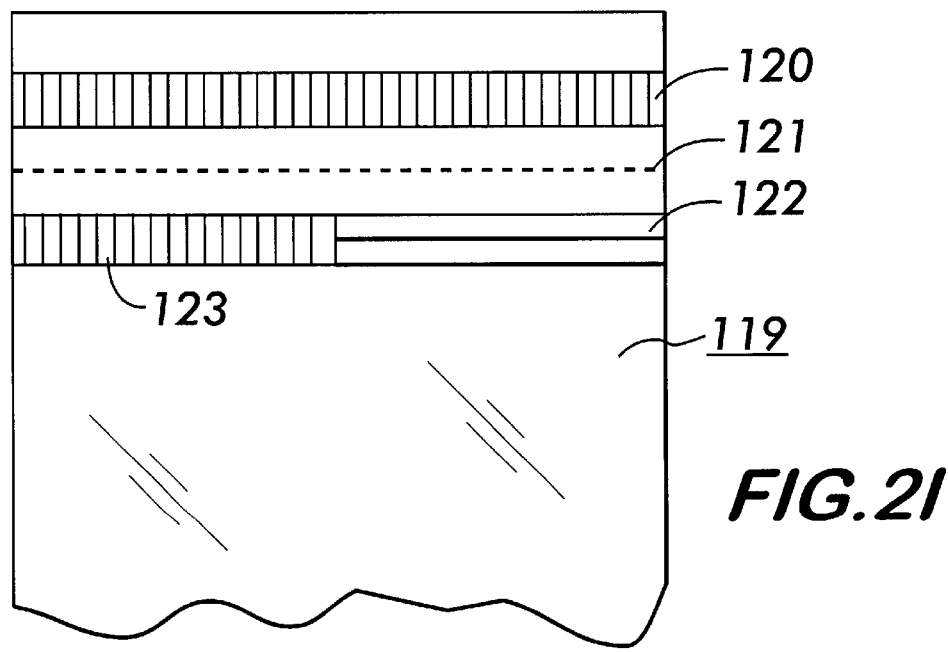
Figure 20:
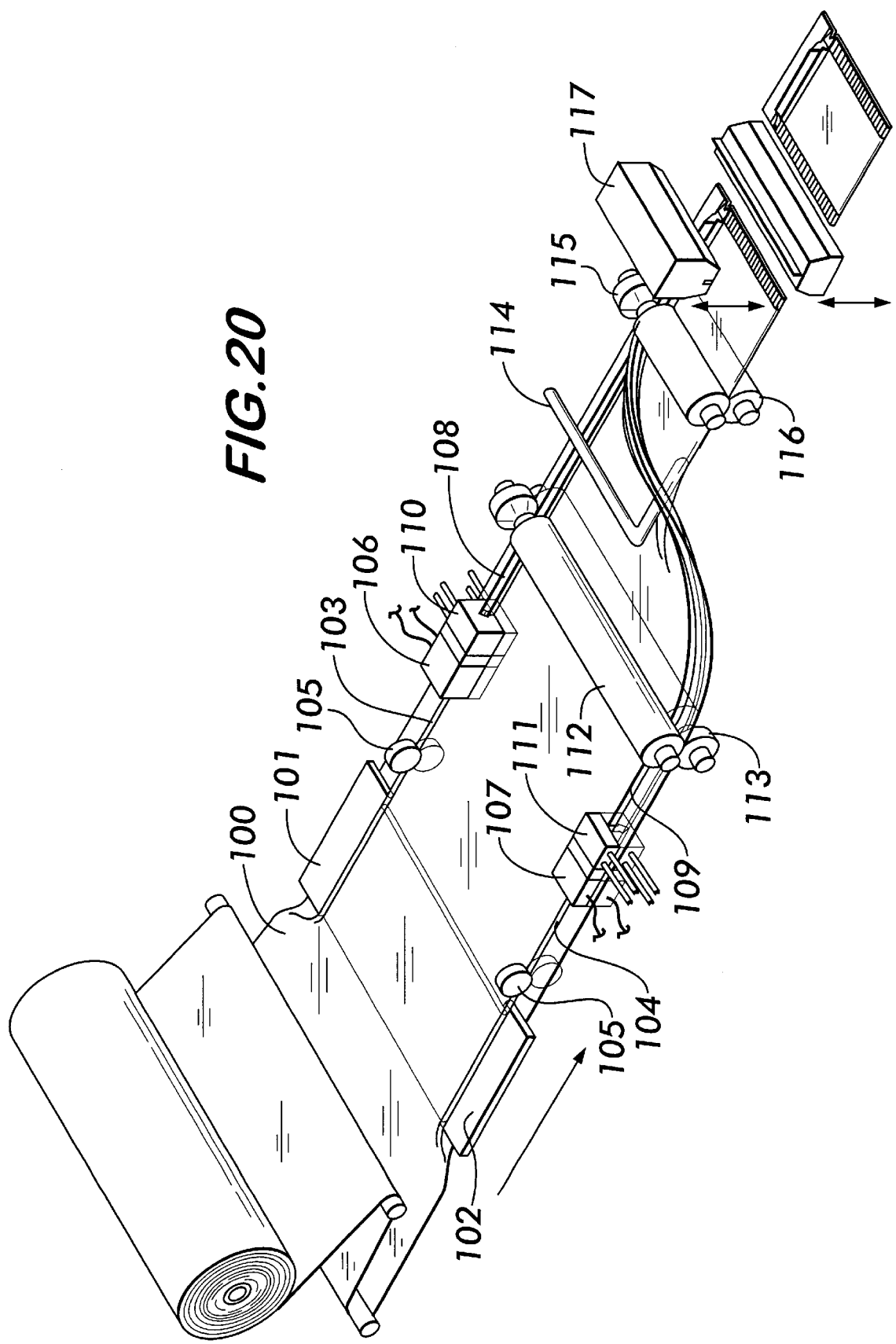
Figure 22:
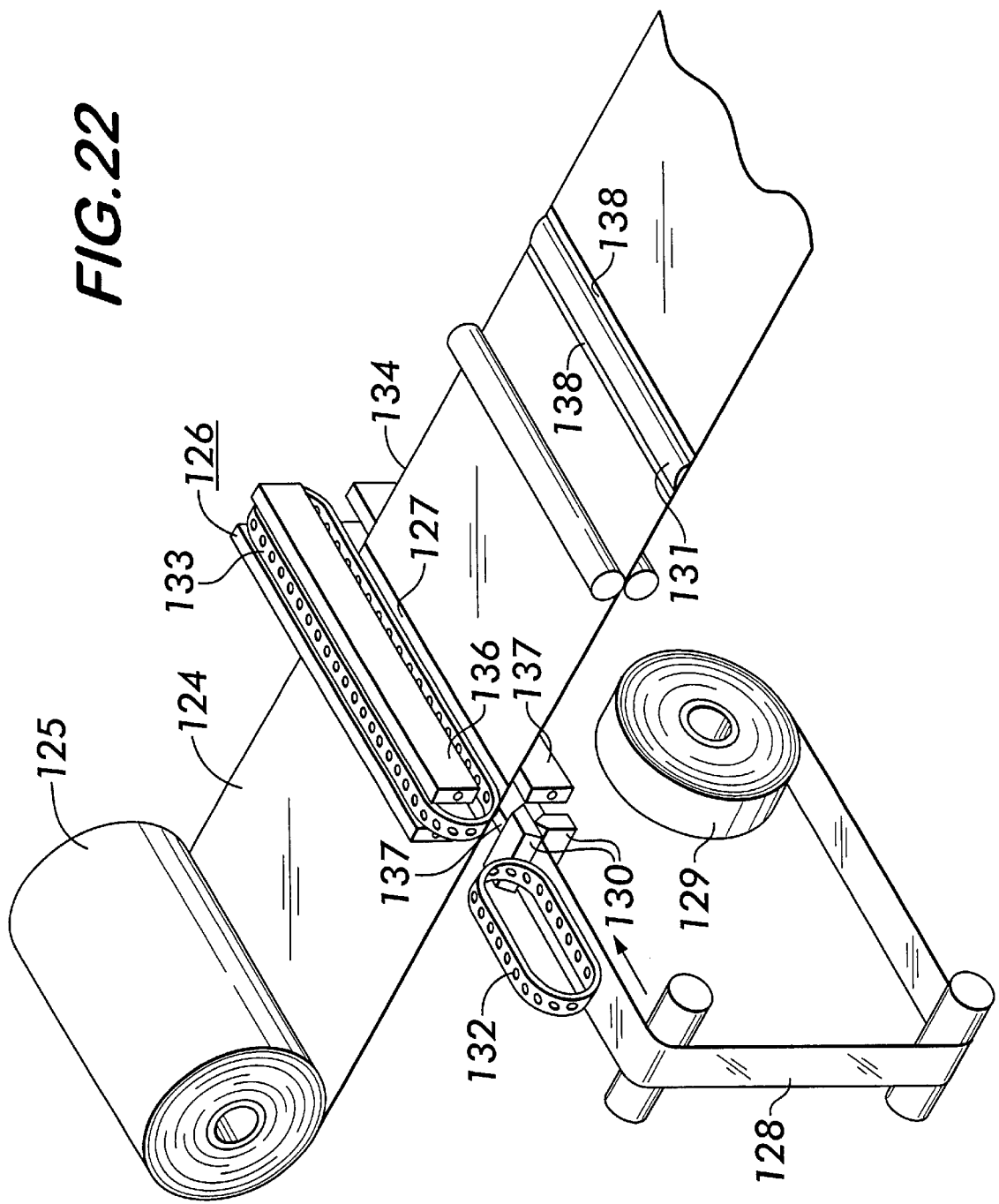

FIG. 12 is a digrammatic fragmentary end view of the longitudinally extending package seal of an open package tube before end sealing, shown as a single overlap type of the kind seen in FIG. 1A, except also showing an additional longitudinally extending strip sandwiched between the overlapped margins of the packaging film web;

FIG. 12A is an enlarged cross sectional view through the resealable closure and package end seal as would be seen when viewed centrally of a package along a line such as 3—3 on FIG. 1 if the package longitudinal seal were as shown in FIG. 12, showing the male portion as formed of three plies of the packaging film and the reinforced female portion as formed of six plies of the packaging film with the added central ply;

FIG. 12B is a diagrammatic showing of a typical apparatus for overlaying a film strip onto a web;

FIG. 13 is an isometric view of a package according to the invention showing a longitudinally extending reinforced reclosable side edge package seal;

FIG. 14 is a diagrammatic line drawing view through the package of FIG. 13 as would be seen when viewed along line 14—14 on FIG. 13 except that the longitudinal package seal is shown as a single overlap type instead of a double overlap type;

FIG. 15 is an enlarged cross sectional view through the resealable closure as would be seen when viewed along the line 15—15 on FIG. 13, showing the male part as formed of three plies of the packaging film and the female part as formed of five plies of the packaging Mm;

FIG. 16 is a diagrammatic illustration of apparatus for and method of formation of packages according to the invention of the type shown in FIG. 13, showing the stages of package forming and closure from the packaging film during the packaging process;

FIG. 17 is a cross sectional view through the fanfolder apparatti for forming the fanfolded stacks of packaging film from which the male and female parts of the interlocking resealable closure of FIG. 13 are formed, as would be seen when viewed along line 17—17 on FIG. 16;

FIG. 18 is a cross sectional view through the heated dies which form the male and female parts of the resealable closure shown in FIGS. 13 and 15, this showing being also applicable to the following cooling devices which set the formed parts, and the insulator blocks therebetween, as would be seen when viewed along line 18—18 on FIG. 16;

FIG. 19 shows an interlock closer for interlocking the formed parts of the closure prior to package formation;

FIG. 20 shows apparatus for continuously forming bags with a resealable closure of the type illustrated in FIG. 13;

FIG. 21 shows a package similar to that of FIG. 1 except that the resealable closure extends only partly across the package; and FIG. 22 is a diagrammatic showing of an apparatus for overlaying a film strip onto a web transversely to the direction of movement of the web to form a strip of stacked film as an alternative to a fanfolded stack.

Figure 22A:
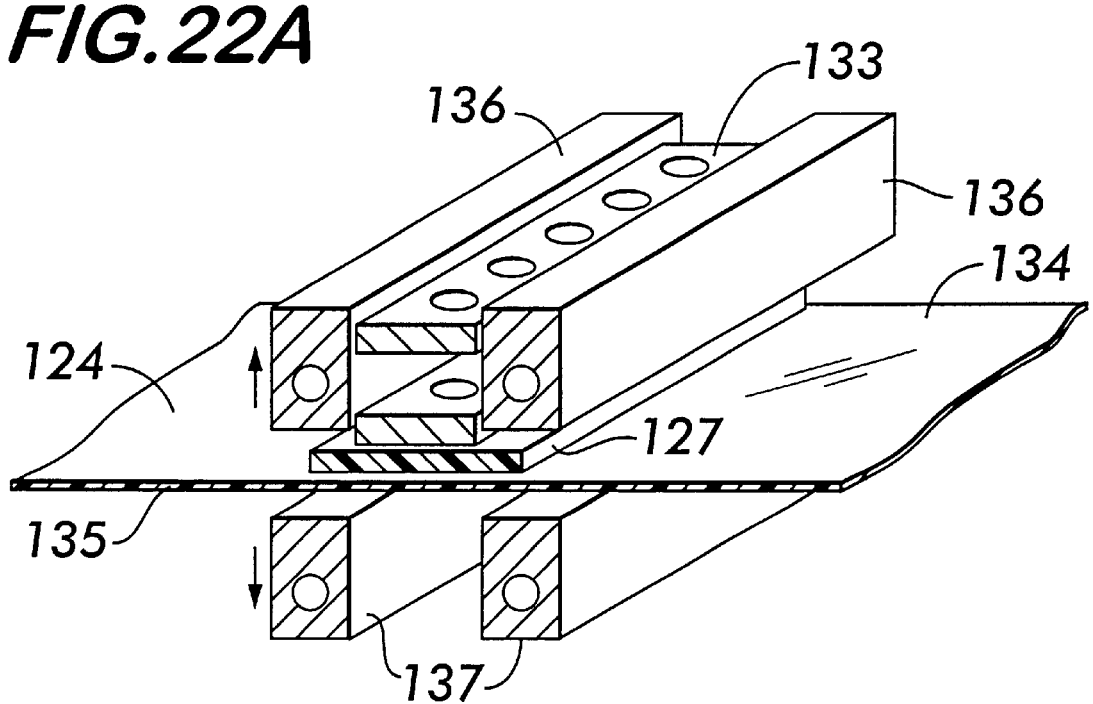
Figure 22B:
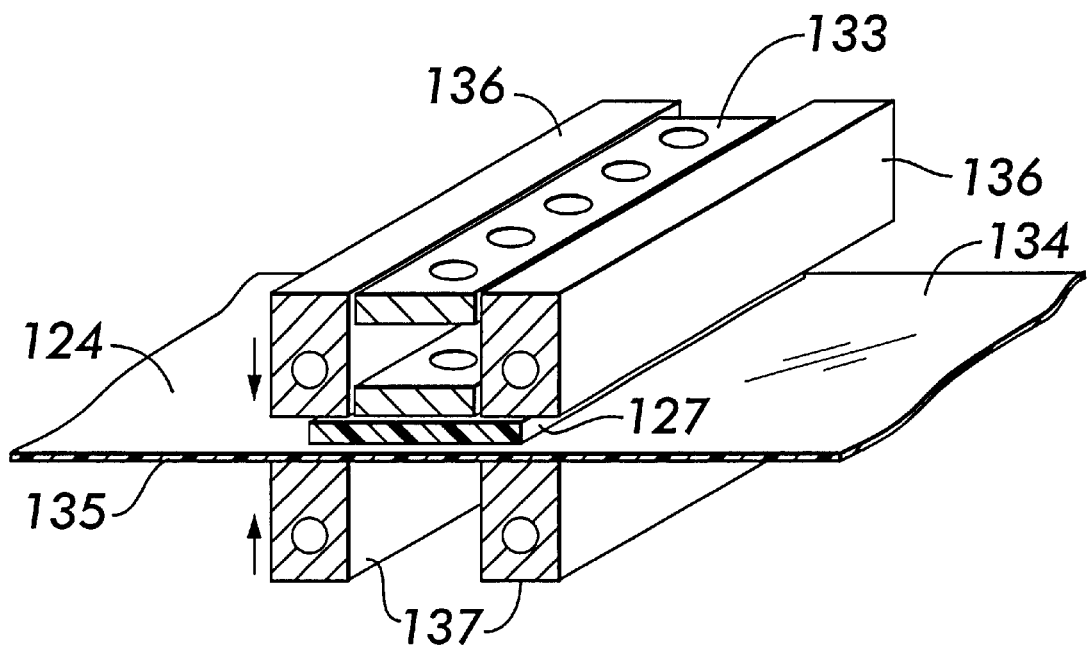

FIGS. 22A and 22B are isometric enlargements of the sealing bars part of the apparatus of FIG. 22 showing the web and film strip prior to and during a sealing operation.

In the several figures, like elements are denoted by like reference characters, which to the extent possible are the same as the correspondingly placed reference characters in the earlier application.

Considering first FIGS. 1 and 11, there are seen packages 20 and 20' having at opposite ends heat sealed end seals 21A/21B and 21'A/21'B, tearoff feature 62, and resealable package locking closures 22 and 22'. The packages are identical except for the shape of the resealable locking closures, closure 22 in FIG. 1 being formed along a straight line, while closure 22' in FIG. 11 is formed along an arc. The straight line form of closure requires less package length than the arcuate form, but the arcuate form provides somewhat easier package opening because the opening force is effectively applied to a shorter length of the closure. Both types are formed in the same way, as will be subsequently shown. The closures 22 and 22' may also have formed into their structures at intervals along their length, hinge formations 31 and/or reinforcing V-notches 60. FIG. 1 is shown with the longitudinal package seal, which is normally the bottom surface of the package, shown uppermost to reveal details of the resealable closure 22.

Figure 1B:
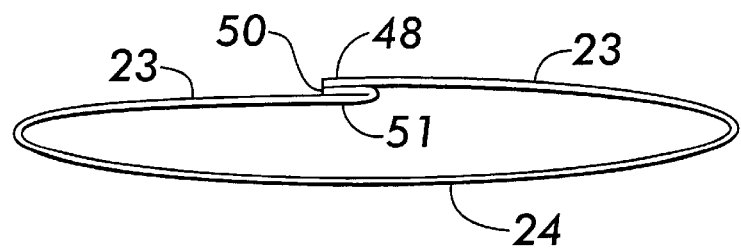
FIG. 1B is a digrammatic end view of an open package tube before end sealing showing the longitudinally extending package seal as a conventional double overlap type.

The single overlap type of longitudinal seal as seen in FIG. 1 is shown in diagrammatic end view in FIG. 1A as an open package tube before end sealing, showing the overlapped outer and inner margins 48 and 49 of the package bottom surface 23, and the continuous package upper surface 24. An enlarged cross section of this closure structure not taken through the overlap is shown in FIG. 2, while a cross section of the closure structure taken through the single overlap is shown in FIG. 3. A cross section of the closure structure as would be seen when taken through the double overlap longitudinal package seal structure shown diagrammatically in FIG. 1B as having an outer layer 48, a middle layer 50 and an inner layer 51, is shown in FIG. 3A. All of these closures are illustratively shown as formed of single or multiple thermally fused triple plies or layers of packaging film, the formation of such triple plies into a strip 30 being described hereinafter. As will be subsequently shown, the resealable closures are formed during the package making process from multiple reversely fanfolded layers of the film from which the packages are made, as best seen in the enlarged cross-sectional views of FIGS. 2, 3 and 3A to which attention should be now directed.

The internested closure sections of all of FIGS. 2, 3 and 3A are seen to be formed in an arrowhead shape with the lower legs of the arrowhead angled inwardly downward toward one another. This angled orientation of the base legs results in easier package opening and reclosing. In FIG. 2 the upper film portion 23 of the package 20 is seen reversely folded into three thermally fused layers 23A/23B/23C forming the outer female section 22A of the closure 22, with the lower film portion 24 being similarly folded into three thermally fused layers 24A/24B/24C forming the inner male section 22B of the closure 22. This structure is the cross section through the interlocking closure taken at any point that is not through the longitudinal package seals shown in FIG. 1A as 48/49 and in FIG. 1B as 48/50/51, and is the same for all of the packages. It is identical to the structure of FIG. 2 of my earlier application and functions in the same way. The package overlap structures of FIGS. 3 and 3A however depart materially from that of FIG. 2 as will be now described.

Considering first the single overlap structure of FIG. 3, it is seen that the inner male closure portion 22B is the same as that of FIG. 2, consisting of three layers of packaging film 24A/24B/24C, but that the outer female portion 22A instead of also having only three layers has six thermally fused layers in the overlap region of margins 48/49, namely, layers 48A/48B/48C/49A/49B/49C. This renders the female closure portion 22A substantially stiffer in this overlap region located centrally of the package, and provides increased holding power of the male closure portion 22B within the female portion 22A at the maximum opening stress region of the package. In the double overlap structure of FIG. 3A it is seen that the inner male closure portion 22B is also the same as that of FIG. 2, consisting of three layers of packaging film 24A/24B/24C, but that the outer female portion 22A instead of also having only three layers has nine thermally fused layers in the overlap region of margins 48/50/51, namely, the layers 48A/48B/48C/50A/50B/50C/51A/51B/51C. This renders female closure portion 22A even stiffer in this overlap region than the structure of FIG. 3.

FIGS. 4 and 5 illustrate the opening of the package 20 by first tearing off the end seal 21B adjacent to the closure 22, as shown in FIG. 4, by means of the tearoff feature 62 shown in FIG. 1, and then opening the resealable locking closure 22 by separating the outer and inner sections 22A and 22B as shown in FIG. 5. The separation process, for those interested, is illustrated in FIGS. 5 and 6 of my earlier application and show the outer and inner sections 22a and 22b, corresponding to 22A and 22B of the present application, being respectively expanded and compressed as the inner section 22b is pulled out of the outer section 22a, and then shown springing back to their static state conditions. The process is identical for the resealable closure of the present application and the drawings are not here repeated. FIG. 5 also illustrates the action of the hinge formations 31 which permit the stiff interlock seal 22 to flex about the hinges 31 and form, in the package shown, a generally octagonal opening that renders access to the package interior much easier. Fewer or more hinges 31 may of course be used depending on the package opening size and the nature of the contents. The reinforcing V-notches 60 stiffen the sections of the resealable closure disposed between the hinges 31. The hinges 31 and V-notches 60 are seen more clearly in the enlarged fragmentary showing of FIG. 5A.

FIG. 6 is a diagrammatic showing of apparatus for producing finished packages as shown in the Figures. Film 25 from a roll 26 of heat sealable packaging film is spooled off and fed around roller 27 and between rollers 28 to the film fanfolding device 29 where at package length intervals the film is multiple folded and edge heat sealed into strips 30 extending fully widthwise of the running film with the strip layers 30 being unsecured to one another between the edge seals. For the straight seal of FIG. 1 the strip width is approximately one half inch, while for the arcuate form of FIG. 11 it could be about one inch. To accomplish this the film 25 is either made of thermoplastic material or is thermoplastically coated. The fanfolding device 29 and the process of forming the film 25 to include the heat sealed fanfolded strip 30 are shown in detail in FIGS. 7 and 8, the position of the apparatus of FIG. 7 being that shown in the operating cycle position of FIG. 8C.

The device 29 consists of, a pair of fanfolding plates 37 having window slots 38, the plates being synchronously shiftable toward and away from one another in slightly separated parallel planes, upper and lower film clamping guide rods 39, and upper and lower heating bars 40A and 40B carried on the guide bars 39. The upper heating bar 40A is provided along its lower face with a centrally longitudinally extending slot 35 which forms a pair of downturned legs 52 extending widthwise of the running length of the film, while the lower heating bar 40B is provided along its upper face with a similar centrally longitudinally extending slot 35 which forms a pair of upturned legs 52, the downturned and upturned pairs of legs 52 being positioned in apposed relationship. The film 25 moves from right to left between the plates 37 as shown by arrows 41 in FIG. 8A. As shown in FIG. 8B by the arrows 42, the plates 37 are shifted toward one another into overlapping position to form a three layer fanfold of film 25 with the windows 38 of the plates 37 vertically aligned. Next, as shown in FIG. 7 and in FIG. 8C by the arrows 43, the film clamping guide rods are shifted toward one another through the windows 38 to clamp the three layers of film together.

As shown in FIG. 8D by arrows 44, the plates 37 are then retracted away from one another, while as shown by arrows 45 the heating bars 40A and 40B are shifted toward one another so that the upper and lower pairs of legs 52 of the heating bars engage the upper and lower outer surfaces of the fanfolded film strip to edge seal the layers together into the heat sealed strip 30 with the layers of strip 30 being unsecured to one another between the edge seals 53 as best seen in FIG. 8F. The unsecured condition of the layers of strip 30 shortens the time required to subsequently form the interlocking closure because the layers conform to the forming dies more easily and do not have to be first resoftened to be formed. Finally, as shown by arrows 46 in FIG. 8E, the rods 39 and heating bars 40A and 40B are retracted, and the strip 30 moves out of the fanfolding device on its way to the packaging device 33. It should be understood that during the course of formation of the strip 30 the entire apparatus 29 moves in the direction of motion of the film 25 and then retracts to its initial position in preparation for the next cycle of strip formation, as shown by the arrow 47.

These strips 30 then proceed to a device for removing the thermoplastic coating from most of the undersurface of the strip, shown illustratively as an abrader generally designated as 63. Other known types of devices are also usable for this purpose, such as corona devices. As seen in FIGS. 6 and 10 the abrader 63 includes a pair of abrading wheels 64 driven by motors 65 supported on a carrier bar 66. The carrier bar 66 reciprocates transversely to the running length of the film to treat the undersurface of the strip 30 which will form the non-sealable facing surfaces of the interlocking closure, as shown by arrow 67, and also moves longitudinally with the film, as shown by arrow 68, for a distance sufficient to complete abrasion of the desired portion of the strip. In the case of a single overlap package as shown diagrammatically in FIG. 1A, the longitudinal film margin which forms the portion 48 is left with its thermoplastic surface intact so that it can subsequently be heat sealed to the opposite film margin 49 during package formation by packaging machine 33. This also is the case for the margin 48 of the double overlap package as shown diagrammatically in FIG. 1B, and for the opposite longitudinally extending film margin which forms the interface between layers 50 and 51. In this latter case, if an abrader is utilized, only one abrading wheel would be used.

Upon completion of a strip treatment the abrader moves downward out of engagement with the film strip 30 and returns to its starting place to engage the next strip. The film then passes around the rollers 32 and into the packaging machine 33 where the items 34 to be packaged, carried on conveyor 36, are wrapped and emerge for end sealing and package cutting by the device designated generally as 69, and formation of the resealable interlocking closure by the device designated generally as 70, being thereafter carried away for packing for shipment by the conveyor 36.

The completion of the packaging by end sealing and reclosable seal formation takes place respectively at the sealing station sealing device 69 and forming device 70 shown in FIG. 6 and in the enlarged cross sectional detail of FIG. 9, to both of which reference should now be made. After emerging from the package forming apparatus 33 the package ends are sealed by the sealing device 69, and at the same time the package resealable locking feature is completed from the strip 30 by a closure former 70. A wrapped product carrying a strip 30 and shown as 71 emerges from the packaging machine 33 and passes to a position between the sealing device 69 and the closure former 70. The upper and lower heat sealing bars 72 and 73 move toward one another to heat seal the ends of adjacent packages to form the opposite end seals 21A and 21B shown in FIGS. 1 and 11, followed closely by the descent of the cutting bar 74 which severs the seals 21A/21B of the adjacent packages from one another. Moreover, the apposed faces of strip 30 are held in proper position for closure forming at former 70 by the immediately adjacent heat seal 21B.

As seen in FIG. 6, the strips 30 have been wrapped during packaging so that each strip is disposed in two layers, one above the other with the abraded surfaces in contact, but remain unsecured to one another so that they may be subsequently separated. As seen in FIG. 9 the closure former 70 consists of an anvil die 54 formed at the lower end of the upper heater block 55, a lower recess die 56 formed at the upper end of lower heater block 57, a pair of apposed reciprocable forming plates 58, vacuum ports 59 in the lower heater block 57, and heaters 61 in the upper and lower heater blocks. The anvil die 54 and recess die 56 are shown as configured to produce the upper end of the arrowhead interlock shape, but also formed longitudinally along these dies are the proper configurations to form the hinges 31 and/or the reinforcing V-notches 60 when it is desired to include them in the interlock closure.

In one method of forming the resealable closure, as the edge sealed strip 30 comes into position between the upper and lower heater blocks 55 and 57 of the forming device 70, the latter move vertically toward one another, and the forming sequence is initiated by moving the heated upper anvil 54 and lower recess 56 into mating position and heat forming the strip 30 into the recess 56 where the strip is retained in position by vacuum drawn through the manifolds 59. The anvil 54 then retracts while the vacuum continues to hold the strip in the recess 56. The forming plates 58 then move toward one another and shape the inturned lower legs of the arrowhead shape into the heat softened strip 30. Finally, the forming plates 58 are retracted and the vacuum is released, thereby releasing the formed resealable closure. The forming device is then retracted to its starting position in preparation for forming the next closure. This sequence repeats and produces a continuous line of packaged products.

In a second, and preferred method of forming the resealable closure, as the edge sealed strip 30 comes into position between the upper and lower heater blocks 55 and 57 of the forming device 70, the latter move vertically toward one another, and the forming sequence is initiated by moving the heated upper anvil 54 and lower recess 56 into mating position and heat forming the strip 30 into the recess 56. Next, the forming plates 58 then move toward one another and press the upper sides of the strip 30 against the sides of the upper heater block male die 55. The upper heater block and male die 55 are then retracted, and the forming plates 58 are moved further inward to pinch together the portion of the strip 30 therebetween and form the arrowhead shape in the interfitted parts of the resealable closure. Then, the lower heater block and female die 56 are moved further upward toward the forming plates 58 to move the rear surfaces of the arrowhead into a more planer alignment, rendering the arrowhead more triangular in shape and more similar to the showing of FIG. 2a of parent application Ser. No. 08/861, 576. The forming plates 58 are then retracted to their starting position in preparation for forming the next closure. This forming method does not require the use of vacuum, and dispenses with the need for that type of apparatus.

Considering now the embodiments of the invention which are formed by edge folding the film web 25 or adding a film strip to increase the number of layers of the longitudinally extending package seal, consider first the edge folding form of making the package. If film web 25 is longitudinally single folded along one edge before entering the fanfold device 29, the single overlap packaging apparatus which produces a longitudinal package seal as shown in FIG. 1A, will produce an interlock 22 as seen in FIG. 3A rather than as seen in FIG. 3. This is because the fanfold device 29 will make a six fold through the folded edge of strip 30. Devices for edge folding running webs are well known in the art, and the edge fold width would be made about the same as the width of the package longitudinal seal.

If instead of edge folding the running web 25, an additional strip 75 of packaging film, or other heat sealable film, is laid over one longitudinal margin of the web 25 with the web edge and one strip edge substantially congruent, two different structures can be produced depending upon the point on the web where the overlay is introduced. If the overlay of strip 75 is done before entry of the web 25 into the fanfold device 29, then the same interlock closure structure results as previously described for edge folding the web, namely, the interlock closure structure shown in FIG. 3A. However, if the overlay of strip 75 is done after the strip 30 has been formed, then the longitudinal package seal will appear as shown in the detail of FIG. 12, and a different interlock closure structure is formed, as shown in FIG. 12A. Strip 75 is shown for illustrative purposes as about three times the thickness of the packaging film 25, but can be of any thickness desired, as determined by the particular application. Apparatus for applying a strip 75 to a web are well known in the art, and typically could be as shown in FIG. 12B in which are seen a film strip roll 76, a pair of strip pulling rollers 77, and a pair of positioning rollers 78 which may also be heat sealing rollers applying the strip to the web 25. The strip 75 could also be a strip slit off of one longitudinally running edge of the web 25 just prior to overlay on the web.

Consider now the isometric view of package 79 as seen in FIG. 13, which shows a longitudinally extending reinforced reclosable side edge package seal 80 having an outer female part 80A and an inner male part 80B, the seal 80 being best seen in the diagrammatic showing of FIG. 14, and a rupturable seal 81 by means of which the package edge margin 82 may be removed to open the package by providing access to the resealable closure 80. FIG. 14 also discloses a single overlap longitudinal package seal 83, which could also be a double overlap seal as a function of the particular type of wrapping machine. FIG. 15 shows an enlarged cross sectional view through resealable closure 80 as would be seen when viewed along line 15—15 on FIG. 13, with the male part 80B formed of three plies 80B1/80B2/80B3 of the packaging film and the female part 80A as illustratively formed of five plies 80A1/80A2/80A3/80A4/80A5 of the packaging film. Apparatus for forming the seal 80 and the package 79 to seen in FIG. 16, to which reference should now be made.

In FIG. 16 there to seen a web of packaging film 84 moving into the broad end of the fanfolding apparatus 85 and emerging from its narrow end as a narrowed web having formed therein the two stacks of folded film 86 and 87 which are immediately heat sealed by the heat seal rollers 90 into sealed strips which respectively will become the female part 80A and the male part 80B of the resealable interlocking closure. As shown in FIG. 17 the four fanfold guide plates 88 continuously form the five layer female stack 86, and the two fanfold guide plates 89 continuously form the three layer male stack 87. The heat sealed stacks 86 and 87 then respectively enter the heated female forming die 91 and heated male forming die 92 where the interlocking female and male parts 80A and 80B respectively are formed in the stacked strips 86 and 87, as best seen in the showing of FIG. 18. If instead of a fanfolded stack it is desired to utilize a strip of heat sealable material to form the strips 86 and 87, the fanfolding apparatus 85 may be replaced with a pair of strip appliers of the kind shown in FIG. 12B.

Upon emergence from the heated forming dies, the closure parts 80A and 80B pass through thermal insulating blocks 93 of the same cross section as the dies and into the cooled setting dies 94 which quickly cool the parts to stable mechanical configurations. Before the web enters into the packaging apparatus 96 the double perforation wheels 95 apply the tear-off perforation lines 81 to the web. The packager 96 wraps the product, forms the longitudinal package seal 83 best seen in FIG. 14, and positions the closure parts 80A and 80B for closure, after which the latter are pressed together into interlocking fit by the press rollers 97 and 98, as best seen in larger detail in FIG. 19. Successive incomplete packages of product are then end sealed and severed by package end sealer and cutter 99 to form individual finished packages 79.

An apparatus for making a continuous series of bags with resealable interlocking closures, somewhat similar in concept to that of FIG. 16, is shown in FIG. 20 where there are seen a web 100 having the running longitudinal edges stack formed by the male and female stackers 101 and 102 into stacks 103 and 104, which stacks are then edge sealed by heat seal rollers 105. The sealed stacks, as before, enter the heated forming dies 106 and 107 where the male and female interlocks 108 and 109 are formed, and emerge from the cooled setting dies 110 and 111. The web with the interlocks formed thereon is advanced by drive rollers 112 and 113, and the web edge carrying the female interlock 109 is turned over the inverter bar 114 Into alignment with the male interlock 108, and the two are pressed into engagement by the press rollers 115 and 116. The bags are completed by the side sealer 117 which heat seals the side edges of the bags and does one of two other things. One option la to make a narrow edge seal and also sever successive bags from one another. Another option is to make a wider fin seal with a line of severance formed midway between the edges of the seal and not to sever the bags, but to wind them on a roll or reverse fold them into a stack for bulk packaging. If instead of a fanfolded stack it is desired to utilize a strip of heat sealable material to form the strips 103 and 104, the fanfolding devices 101 and 102 may be replaced with a pair of strip appliers of the kind shown in FIG. 12B.

An alternative form of package to that shown in FIG. 1 is shown in FIG. 21 as 119, and can be produced by the same apparatus as shown in FIG. 6 by a modification to the closure former dies 70. As seen in FIG. 21 the package 119 has most of the same features as the package of FIG. 1, namely, an end seal 120, a tear-of feature 121, and a resealable closure 122. However, the package of FIG. 21 differs from that of FIG. 1 in that the resealable closure 122 extends only partly across the width of the package, the rest of the package in line with the closure 122 being formed as a permanent heat seal 123. This form of package is useful when the package contents is a pourable material, such as cereal or rice, or the like, and it is desirable to have the package open only partly for better pouring control. The relative lengths of the resealable closure 122 and permanent seal 123 can be proportioned as desired by the configuration of the closure forming dies 70.

Considering finally FIGS. 22, 22A and 22B, there is shown an alternative apparatus for forming the stacked edge-sealed strip from which the resealable interlocking package closure is formed transversely to the web. Instead of fanfolding the web of packaging film as previously shown and described, a stack is formed by securing a separate strip of substantially constant thickness material to the web of packaging film transversely to its running length rather than colinearly as shown in FIG. 12B. Multiple strips can be so stacked or a single strip of whatever thickness is desired. In FIG. 22 there is seen packaging film 124 spooling off of a roll 125 and passing into and through a sealing device 126 where a piece 127 of a strip of flexible material 128 which spools off of a roll 129 is heat sealed to the film 124 after being severed from the strip 128 by the knife and anvil 130. Stacked heat-sealed strips 131 are produced at package length intervals by the apparatus to be now described.

A vacuum belt 132 draws the strip material from the supply roll 129 in the manner well known In the art and feeds it through the knife and anvil 130 transversely across the upper surface of the web 124, the strip being picked up by the vacuum belt 133 and carried to a point approximately an inch from the far edge 134 of the web 124, the one inch representing the spacing of the knife 130 from the near edge 135 of the web 124. Next, the knife 130 severs the the piece 127 from the strip 128, and the vacuum belt 133 moves the ends of severed strip 127 the remaining inch into congruency with the web edges 134 and 135. At this point in the cycle the movement of web 124 and the vacuum belts 132 and 133 are stopped, as seen in FIG. 22A, and the severed piece 127 is heat sealed to the web 124. Heat sealing is effected by the upper heat seal bars 136 and lower heat seal bars 137 which, as seen in FIG. 22B, are moved respectively down and up to heat seal the edges of the stacked strip and web, as at 138. The sealer bars are then retracted, and movement of the web 124 and strip 128 resumes for the next cycle.

The surface of the strip 128 which is not sealed to the web 124 does not have heat-sealable properties so that a surface abrading device such as is shown at 63 in FIG. 6 is not needed. However, a patch of hot melt material is applied to either the terminal upper inch of one or both ends of the strip 131 at a downstream station, depending upon the type of longitudinal seal that is to be formed.

Having now described the invention in connection with particularly illustrated embodiments thereof, it will be understood that modifications and variations of the invention may now occur from time to time to those normally skilled in the art without departing from the essential scope or spirit of the invention, and accordingly it is intended to claim the invention both broadly and specifically as indicated in the appended claims.

What is claimed is:

1. A flexible package entirely formed from a continuous web of substantially constant thickness packaging material, comprising in combination,
   a) a closed package body comprising at least one thickness of flexible packaging material and having opposite ends,
   b) at least one package body end seal,
   c) a repeatably openable and resealable interlocking closure comprising inner and outer interlocking portions integral with the said package body and comprising multiple stacked and sealed together continuously connected layers of the packaging material said closure being operative to open and close said package body to provide and prevent, respectively, access to the package interior, and at least a part of said interlocking closure outer portion comprising at least one more layer of packaging material than said inner portion.

2. A package as set forth in claim 1 wherein said multiple stacked and sealed together continuously connected layers of the packaging material which forms said resealable interlocking closure comprises at least three thicknesses.

3. A package as set forth in claim 1 wherein said resealable interlocking closure is arcuate in shape.

4. A package as set forth in claim 1 wherein said inner and outer interlocking portions of said resealable interlocking closure are both substantially of arrowhead shape in cross section.

5. A package as set forth in claim 1 wherein said at least one end seal is thermally fused end portions of the material of which the package body is made.

6. A package as set forth in claim 1 wherein said flexible material of which said package body, said at least one end seal, and said interlocking closure are formed is a heat seal coated plastic film.

7. A package as set forth in claim 1 wherein said flexible material of which said package body, said at least one end seal, and said interlocking closure are formed is a heat seal coated non-plastic film.

8. A package as set forth in claim 1 wherein said package body further includes a pair of spaced apart body end seals and a longitudinal package seal extending between said pair of spaced apart body end seals, and wherein said package is rectangular in shape having a longer and a narrower dimension, said spaced apart body end seals being disposed across the narrower dimension of the package, and said resealable interlocking closure being disposed between said spaced apart body end seals along said longer package dimension.

9. A package as set forth in claim 1 wherein said package is rectangular in shape having a longer and a narrower dimension, and wherein said at least one package body end seal comprises a pair of package body end seals, one of said pair of package body end seals being located at one end of the said package body and the other of said pair of package body end seals being located at the other end of said package body, the said resealable interlocking closure being located on the package body side of one of said end seals, and wherein said resealable interlocking closure and said pair of package body end seals are all disposed across the narrower dimension of the package.

10. A package as set forth in claim 1 wherein said resealable interlocking closure extends only partly across said package body, the extension of said closure across the rest of said package body being a permanent package seal.

11. A flexible package entirely formed from a continuous web of substantially constant thickness packaging material, comprising in combination,
 a) a closed package body comprising at least one thickness of flexible material and having opposite ends and a longitudinal package seal extending between said package ends,
 b) at least one package body end seal,
 c) a repeatably openable and resealable interlocking closure comprising inner and outer interlocking portions integral with said package body and comprising multiple stacked and sealed together continuously connected layers of the packaging material, said closure being operative to open and close said package body to provide and prevent respectively access to the package interior, a portion of said package longitudinal seal being formed into and comprising an integral structural part of said outer portion of said resealable interlocking closure.

12. A package as set forth in claim 11 wherein said package is rectangular in shape having a longer and a narrower dimension and upper and lower faces, said package longitudinal seal being disposed in one of said upper and lower faces, and said resealable interlocking closure being disposed across the narrower dimension of the package.

13. A package as set forth in claim 11 wherein said package is rectangular in shape having a longer and a narrower dimension and said resealable interlocking closure is disposed across the narrower dimension of the package.

14. A package as set forth in claim 11 wherein said package is rectangular in shape having a longer and a narrower dimension and a pair of spaced apart package body end seals, said resealable interlocking closure and said package body end seals being disposed across the said narrower dimension of the package.

15. A package as set forth in claim 11 wherein said at least one package body end seal comprises a pair of package body end seals, one of said pair of end seals being located at one end of the said package body and the other of said pair of end seals being located at the other end of said package body, and wherein the said resealable interlocking closure is located between said end seals and closely adjacent to one of said end seals.

16. A package as set forth in claim 11 wherein said at least one package body end seal comprises a pair of package body end seals, one of said pair of end seals being located at one end of the said package body and the other of said pair of end seals being located at the other end of said package body, wherein the said resealable interlocking closure is located between said end seals and closely adjacent to one of said end seals, wherein said multiple stacked and sealed together layers of the packaging material which forms said resealable interlocking closure comprises at least three layers, and wherein said flexible material of which said package body, said end seals, and said interlocking closure are formed is a heat seal coated plastic film.

17. A package as set forth in claim 11 wherein said resealable interlocking closure is located at the opposite end of said package body from the said at least one end seal.

18. A package as set forth in claim 11 wherein said resealable interlocking closure further includes at least one hinge formation positioned substantially centrally along the length thereof.

19. A package as set forth in claim 11 wherein said resealable interlocking closure further includes a plurality of hinge formations spaced along the length thereof.

20. A package as set forth in claim 11 wherein said resealable interlocking closure further includes a plurality of reinforcing V-notch formations spaced along the length thereof.

21. A package as set forth in claim 11 wherein said resealable interlocking closure further includes at least one hinge formation positioned substantially centrally along the length thereof and a plurality of spaced apart reinforcing V-notch formations.

22. A package as set forth in claim 11 wherein said multiple stacked and sealed together continuously connected layers of the packaging material which forms said resealable interlocking closure comprises at least three thicknesses.

23. A package as set forth in claim 12 wherein said at least one package longitudinal seal is positioned substantially centrally between the edges of the package face of which it forms a part.

24. A package as set forth in claim 16 wherein said end seals are thermally fused end portions of the material of which the package body is made.

25. A package as set forth in claim 16 wherein said package is rectangular in shape having a longer and a narrower dimension, and said resealable interlocking closure and both of said package end seals are disposed across the narrower dimension of the package.

26. A flexible package entirely formed from a continuous web of substantially constant thickness packaging material, comprising in combination,
   a) a closed package body comprising at least one thickness of flexible material and having opposite ends and at least upper and lower faces,
   b) at least one package body end seal,
   c) at least one package longitudinal seal extending longitudinally between said package ends and forming a part of one of said upper and lower faces, said longitudinal seal being positioned between and non-adjacent to the edges of the package face of which it forms a part,
   d) a repeatably openable and resealable interlocking closure comprising inner and outer interlocking portions integral with the said package body and comprising multiple stacked and sealed together continuously connected layers of the packaging material, said closure being operative to open and close said package body to provide and prevent respectively access to the package interior, a portion of said package longitudinal seal being formed into and comprising an integral structural part of said outer portion of said resealable interlocking closure.

27. A package as set forth in claim 26 wherein said at least one package longitudinal seal is positioned substantially centrally between the edges of the package face of which it forms a part.

28. A flexible package entirely formed from a continuous web of substantially a constant thickness packaging material, comprising in combination,
   a) a closed package body comprising at least one thickness of flexible packaging material and having opposite ends and a longitudinal package seal extending between said package ends,
   b) at least one package body end seal,
   c) a repeatably openable and resealable interlocking closure comprising inner and outer interlocking portions Integral with said package body and comprising multiple stacked and sealed together continuously connected layers of the packaging material, said closure being operative to open and close sad package body to provide and prevent respectively access to the package interior, and
   d) at least one additional thickness of flexible heat sealable material heat sealed to and, forming a part of at least a portion of said interlocking closure outer portion.

29. A package as set forth in claim 28 wherein said at least one additional thickness of of flexible heat sealable material extends substantially the full length of said interlocking closure outer portion.

30. A package as set forth in claim 28 wherein said longitudinal package seal forms a part of said interlocking closure outer portion, and said at least one additional thickness of flexible heat sealable material comprises part of that portion of said longitudinal package seal which forms a part of said interlocking closure outer portion.

31. A flexible package formed from a continuous web of substantially constant thickness packaging material comprising in combination,
   a) a closed package body comprising at least one thickness of flexible material and having opposite ends,
   b) at least one package body end seal,
   c) a repeatably openable and resealable interlocking closure comprising inner and outer interlocking portions integral with the said package body and comprising stacked and sealed together layers of said packaging material and at least one discrete strip of substantially constant thickness flexible material, said closure being operative to open and close said package body to provide and prevent, respectively, access to the package interior, and at least a part of said interlocking closure outer portion comprising at least one more layer than said inner portion, said at least one more layer comprising said at least one discrete strip.

32. A package as set forth in claim 31 wherein said package body further includes a pair of spaced apart body end seals and a longitudinal package seal extending between said pair of spaced apart body end seals, and wherein said package is rectangular in shape having a longer and a narrower dimension, said spaced apart body end seals being disposed across the narrower dimension of the package, and said resealable interlocking closure being disposed between said spaced apart body end seals along said longer package dimension.

33. A package as set forth in claim 31 wherein said resealable interlocking closure further includes at least one hinge formation positioned substantially centrally along the length thereof.

34. A package as set forth in claim 31 wherein said resealable interlocking closure further includes a plurality of reinforcing V-notch formations spaced along the length thereof.

35. A package as set forth in claim 31 wherein said flexible material of which said package body, said at least one end seal, and said interlocking closure are formed are heat seal coated plastic films.

36. A package as set forth in claim 32 wherein said resealable interlocking closure further includes at least one hinge formation positioned substantially centrally along the length thereof and a plurality of spaced apart reinforcing V-notch formations.

37. A package as set forth in claim 32 further including at least one additional thickness of flexible heat sealable material heat sealed to and forming a part of at least a portion of said interlocking closure outer portion.

38. A flexible package formed from a continuous web of substantially constant thickness packaging material comprising in combination,
   a) a closed package body comprising at least one thickness of flexible material and having opposite ends,
   b) at least one package body end seal,
   c) a repeatably openable and resealable interlocking closure comprising inner and outer interlocking portions integral with the said package body and comprising stacked and sealed together layers of said packaging material and at least one discrete strip of substantially constant thickness flexible material configured and interlocked with said packaging material, said closure being operative to open and close said package body to provide and prevent, respectively, access to the package interior.

39. A package as set forth in claim 38 wherein said package body further includes a pair of spaced apart body end seals and a longitudinal package seal extending between said pair of spaced apart body end seals, and wherein said package is rectangular in shape having a longer and a narrower dimension, said spaced apart body end seals being disposed across the narrower dimension of the package, and said resealable interlocking closure being disposed between said spaced apart body end seals along said longer package dimension.

40. A package as set forth in claim 38 wherein said package body further includes a pair of spaced apart body end seals and a longitudinal package seal extending between said pair of spaced apart body end seals, and wherein said package is rectangular in shape having a longer and a narrower dimension, said spaced apart body end seals being disposed across the narrower dimension of the package, and said resealable interlocking closure being disposed between said spaced apart body end seals along said narrower package dimension.

* * * * *